US010837399B2

(12) United States Patent
Horigome et al.

(10) Patent No.: US 10,837,399 B2
(45) Date of Patent: Nov. 17, 2020

(54) METHOD OF MANUFACTURING INTERNAL COMBUSTION ENGINE, INTERNAL COMBUSTION ENGINE, AND CONNECTED CYLINDER

(71) Applicants: TPR CO., LTD., Tokyo (JP); TPR INDUSTRY CO., LTD., Sagae (JP)

(72) Inventors: Masami Horigome, Sagae (JP); Akira Sato, Sagae (JP); Takashi Oizumi, Sagae (JP); Takashi Inoue, Tokyo (JP); Akira Hikone, Tokyo (JP)

(73) Assignees: TPR CO., LTD., Tokyo (JP); TPR INDUSTRY CO., LTD., Sagae (JP)

(*) Notice: Subject to any disclaimer, the term of this patent is extended or adjusted under 35 U.S.C. 154(b) by 0 days.

(21) Appl. No.: 16/319,248

(22) PCT Filed: Mar. 27, 2017

(86) PCT No.: PCT/JP2017/012360
§ 371 (c)(1),
(2) Date: Jan. 18, 2019

(87) PCT Pub. No.: WO2018/016130
PCT Pub. Date: Jan. 25, 2018

(65) Prior Publication Data

US 2019/0277220 A1 Sep. 12, 2019

(30) Foreign Application Priority Data

Jul. 19, 2016 (JP) ................................ 2016-141578

(51) Int. Cl.
*F02F 1/10* (2006.01)
*B22D 19/00* (2006.01)
(Continued)

(52) U.S. Cl.
CPC ............ *F02F 1/10* (2013.01); *B22D 19/0009* (2013.01); *B29C 45/14* (2013.01); *F01P 3/02* (2013.01);
(Continued)

(58) Field of Classification Search
CPC ...... F02F 1/10; F02F 1/00; F02F 1/004; F02F 2200/06; F02F 1/108; F02F 2200/00;
(Continued)

(56) References Cited

U.S. PATENT DOCUMENTS 5,671,532 A 9/1997 Rao et al.
5,732,671 A * 3/1998 Takami .............. B22D 19/0009 123/193.2
(Continued)

FOREIGN PATENT DOCUMENTS

CN 1144941 C 4/2004
DE 4230596 A1 3/1994
(Continued)

OTHER PUBLICATIONS

International Search Report and Written Opinion for PCT/JP2017/012360, dated Jun. 6, 2017.
(Continued)

*Primary Examiner* — Jacob M Amick
*Assistant Examiner* — Charles Brauch
(74) *Attorney, Agent, or Firm* — Merchant & Gould P.C.

(57) ABSTRACT

Provided are a method of manufacturing an engine, an engine, and a connected cylinder. The method of manufacturing an engine includes at least a fitting step of fitting a connected cylinder to a hollow portion of a cylinder block main body. The connected cylinder is (1) a first connected cylinder including two or more cylinder liners and a connecting portion configured to connect the two or more cylinder liners to each other or (2) a second connected
(Continued)

cylinder including a connected cylinder main body portion having two or more cylinder bores and a coating configured to cover an inner peripheral surface of the connected cylinder main body portion in which the cylinder bores are formed. The cylinder block main body has one end side, another end side, and the hollow portion passing through the cylinder block main body from the one end side to the another end side.

12 Claims, 13 Drawing Sheets

(51) Int. Cl.

| | |
|---|---|
| ***B29C 45/14*** | (2006.01) |
| ***F01P 3/02*** | (2006.01) |
| ***F02F 1/00*** | (2006.01) |
| ***B29L 31/00*** | (2006.01) |

(52) U.S. Cl.

CPC ................ *F02F 1/00* (2013.01); *F02F 1/004* (2013.01); *B29L 2031/748* (2013.01); *F01P 2003/021* (2013.01); *F02F 2200/06* (2013.01)

(58) Field of Classification Search

CPC ....... F01P 3/02; F01P 2003/021; B29C 45/14; B22D 19/0009; B22D 19/08; B29L 2031/748

See application file for complete search history.

(56) References Cited

U.S. PATENT DOCUMENTS

| | | | | |
|---|---|---|---|---|
| 6,116,198 | A | 9/2000 | Kirtley et al. | |
| 6,148,515 | A | 11/2000 | Suzuki et al. | |
| 6,799,541 | B1 | 10/2004 | Clinton et al. | |
| 2003/0019443 | A1 | 1/2003 | Thompson | |
| 2005/0188839 | A1 | 9/2005 | Inoue | |
| 2013/0340700 | A1* | 12/2013 | Donahue | F02F 1/004 123/193.2 |
| 2015/0159581 | A1 | 6/2015 | Maki et al. | |

FOREIGN PATENT DOCUMENTS

| | | | | | |
|---|---|---|---|---|---|
| JP | 57-101344 | U | | 6/1982 | |
| JP | 57-123932 | U | | 8/1982 | |
| JP | S59-100944 | U | | 7/1984 | |
| JP | 60-94230 | A | | 5/1985 | |
| JP | S6094230 | A | * | 5/1985 | |
| JP | 61-3950 | U | | 1/1986 | |
| JP | 62-13758 | A | | 1/1987 | |
| JP | 7-132362 | A | | 5/1995 | |
| JP | 8-200147 | A | | 8/1996 | |
| JP | 8-210177 | A | | 8/1996 | |
| JP | 8-246944 | A | | 9/1996 | |
| JP | 9-96245 | A | | 4/1997 | |
| JP | 9-209824 | A | | 8/1997 | |
| JP | 10-169503 | A | | 6/1998 | |
| JP | 2813947 | B2 | | 10/1998 | |
| JP | 2000-145537 | A | | 5/2000 | |
| JP | 2000-233271 | A | | 8/2000 | |
| JP | 2002-4939 | A | | 1/2002 | |
| JP | 2002-89353 | A | | 3/2002 | |
| JP | 2002-97997 | A | | 4/2002 | |
| JP | 2002097997 | A | * | 4/2002 | F02F 1/108 |
| JP | 2002-221079 | A | | 8/2002 | |
| JP | 2003-74412 | A | | 3/2003 | |
| JP | 2005-248729 | A | | 9/2005 | |
| JP | 2006-242071 | A | | 9/2006 | |
| JP | 2006-291801 | A | | 10/2006 | |
| JP | 2007-196242 | A | | 8/2007 | |
| JP | 4278125 | B2 | | 6/2009 | |
| JP | 2011-127610 | A | | 6/2011 | |
| JP | 2013-011283 | A | | 1/2013 | |
| WO | 2015/049330 | A1 | | 4/2015 | |

OTHER PUBLICATIONS

Office Action for Japanese Patent Application No. 2018-156691, dated Apr. 16, 2019.

Search Report for European Patent Application No. 17830650.2, dated Feb. 11, 2020.

Office Action for Chinese Patent Application No. 201780039657.0, dated Aug. 4, 2020.

* cited by examiner

METHOD OF MANUFACTURING INTERNAL COMBUSTION ENGINE, INTERNAL COMBUSTION ENGINE, AND CONNECTED CYLINDER

This application is a National Stage of International Patent Application No. PCT/JP2017/012360, filed Mar. 27, 2017, which claims benefit of Japanese Patent Application No. 2016-141578, filed Jul. 19, 2016, which applications are incorporated herein by reference. To the extent appropriate, a claim of priority is made to each of the above disclosed applications.

TECHNICAL FIELD

The present invention relates to a method of manufacturing an internal combustion engine, to an internal combustion engine, and to a connected cylinder.

BACKGROUND

Hitherto, as a cylinder block used for purpose of, for example, reduction in size and weight of a reciprocating-type multi-cylinder internal combustion engine, there has been known a so-called Siamese-type cylinder block having a structure formed by integrally connecting cylinder liners which respectively form adjacent cylinder bores. As a method of manufacturing the cylinder block described above, there have been known, for example, (1) a method of placing a group of cylinder liners in a die at the time of casting of the cylinder block and then casting the group of cylinder liners into a cylinder block main body to fix the group of cylinder liners to the cylinder block main body, and (2) a method of fixing the group of cylinder liners to a cylinder main body through fitting (Patent Literature 1 and Patent Literature 2). In each of the methods of manufacturing a cylinder block, which are disclosed in Patent Literature 1 and Patent Literature 2, the plurality of cylinder liners are integrally formed, and the group of cylinder liners formed of one member is used.

CITATION LIST

Patent Literature

[PTL 1] JP 2813947 B2
[PTL 2] JP 4278125 B2

SUMMARY OF INVENTION

Technical Problem

Meanwhile, for an internal combustion engine, various kinds of performances are required to be satisfied in accordance with requirement specifications of a vehicle or apparatus other than the vehicle, for which the internal combustion engine is used. For this purpose, when the internal combustion engine is designed, the internal combustion engine having a higher degree of freedom in design is advantageous. Further, the internal combustion engine is also required to be excellent in maintainability. Further, in recent years, the internal combustion engine is required to have recycling efficiency in terms of an environmental load. As a result of examination by the inventors of the present invention, however, it has been found that there is difficulty in satisfying all of three requirements, specifically, the maintainability, the recycling efficiency, and the degree of freedom in design with the methods of manufacturing a cylinder block, which are disclosed in Patent Literature 1 and Patent Literature 2, and internal combustion engines manufactured by using the methods.

The present invention has been made in view of the conditions described above, and has an object to provide a method of manufacturing an internal combustion engine, which provides excellent maintainability and recycling efficiency for an internal combustion engine and a high degree of freedom in design of the internal combustion engine, an internal combustion engine manufactured by using the method, and a connected cylinder to be used therefor.

Solution to Problem

The object described above is accomplished by the following aspects of the present invention.

That is, according to one aspect of the present invention, there is provided a method of manufacturing an internal combustion engine, including at least a fitting step of fitting a connected cylinder to a hollow portion of a cylinder block main body, the connected cylinder including anyone of connected cylinders selected from the group consisting of: (1) a first connected cylinder including two or more cylinder liners and a connecting portion configured to connect the two or more cylinder liners to each other; and (2) a second connected cylinder including a connected cylinder main body portion having two or more cylinder bores and a coating configured to cover an inner peripheral surface of the connected cylinder main body portion in which the cylinder bores are formed, the cylinder block main body having one end side where a crankcase is formed and another end side where a cylinder head is attachable, the hollow portion passing through the cylinder block main body from the one end side to the another end side.

According to one embodiment of the present invention, in the method of manufacturing an internal combustion engine, it is preferred that the two or more cylinder liners and the connecting portion be formed integrally and inseparably.

According to another embodiment of the present invention, in the method of manufacturing an internal combustion engine, it is preferred that the connecting portion cover entire outer peripheral surfaces of the two or more cylinder liners.

According to still another embodiment of the present invention, in the method of manufacturing an internal combustion engine, it is preferred that a material that forms the connecting portion be different from a material that forms the cylinder block main body.

According to still another embodiment of the present invention, in the method of manufacturing an internal combustion engine, it is preferred that a material that forms the connected cylinder main body portion be different from a material that forms the cylinder block main body.

According to still another embodiment of the present invention, in the method of manufacturing an internal combustion engine, it is preferred that the connected cylinder include the first connected cylinder, and that a sliding surface formation step of forming sliding surfaces by finishing inner peripheral surfaces of the cylinder liners be carried out only before the fitting step.

According to still another embodiment of the present invention, in the method of manufacturing an internal combustion engine, it is preferred that the connected cylinder include the first connected cylinder, that, after a coating formation step of forming coatings on inner peripheral surfaces of the cylinder liners is carried out, a sliding surface formation step of forming sliding surfaces by finishing surfaces of the coatings be carried out, and that the sliding surface formation step be carried out only before the fitting step.

According to still another embodiment of the present invention, in the method of manufacturing an internal combustion engine, it is preferred that the connected cylinder include the second connected cylinder, and that a sliding surface formation step of forming a sliding surface by finishing a surface of the coating configured to cover the inner peripheral surface of the connected cylinder main body portion in which the cylinder bores are formed be carried out only before the fitting step.

According to still another embodiment of the present invention, in the method of manufacturing an internal combustion engine, it is preferred that the connected cylinder include the first connected cylinder, and that a sliding surface formation step of forming sliding surfaces by finishing inner peripheral surfaces of the cylinder liners be carried out only after the fitting step.

According to still another embodiment of the present invention, in the method of manufacturing an internal combustion engine, it is preferred that the connected cylinder include the first connected cylinder, that, after a coating formation step of forming coatings on inner peripheral surfaces of the cylinder liners is carried out, a sliding surface formation step of forming sliding surfaces by finishing surfaces of the coatings be carried out, and that the sliding surface formation step be carried out only after the fitting step.

According to still another embodiment of the present invention, in the method of manufacturing an internal combustion engine, it is preferred that the connected cylinder include the second connected cylinder, and that a sliding surface formation step of forming a sliding surface by finishing a surface of the coating configured to cover the inner peripheral surface of the connected cylinder main body portion in which the cylinder bores are formed be carried out only after the fitting step.

According to still another embodiment of the present invention, in the method of manufacturing an internal combustion engine, it is preferred that a cooling fluid passage formation step of forming a cooling fluid passage between two adjacent ones of the cylinder bores of the connected cylinder be carried out at least before the fitting step.

According to still another embodiment of the present invention, in the method of manufacturing an internal combustion engine, it is preferred that the cylinder block main body be formed by any method selected from casting and resin molding.

According to one aspect of the present invention, there is provided an internal combustion engine including at least: a connected cylinder selected from the group consisting of: (1) a first connected cylinder including two or more cylinder liners and a connecting portion configured to connect the two or more cylinder liners to each other; and (2) a second connected cylinder including a connected cylinder main body portion having two or more cylinder bores and a coating configured to cover an inner peripheral surface of the connected cylinder main body portion in which the cylinder bores are formed; and a cylinder block main body having one end side where a crankcase is formed, another end side where a cylinder head is attachable, and a hollow portion passing through the cylinder block main body from the one end side to the another end side, wherein the connected cylinder is fitted to the hollow portion of the cylinder block main body so as to be removable.

According to one embodiment of the present invention, in the internal combustion engine, it is preferred that a cooling fluid jacket be provided between an outer peripheral surface of the connected cylinder and an inner peripheral surface of the hollow portion of the cylinder block main body.

According to another embodiment of the present invention, in the internal combustion engine, it is preferred that a projecting portion be formed at least on a portion of the outer peripheral surface of the connected cylinder, which is located on the another end side (cylinder head side), and that a distal end of the projecting portion be held in close contact with a portion of the inner peripheral surface of the hollow portion of the cylinder block main body, which is located on the another end side (cylinder head side).

According to still another embodiment of the present invention, in the internal combustion engine, it is preferred that a fixing member configured to fix the connected cylinder and the cylinder block main body to each other be provided between a portion of the outer peripheral surface of the connected cylinder, which is located on the another end side (cylinder head side), and a portion of the inner peripheral surface of the cylinder block main body, which is located on the another end side (cylinder head side).

According to still another embodiment of the present invention, in the internal combustion engine, it is preferred that the first connected cylinder have a connected ring-like outer peripheral shape having a ring-like portion with a diameter larger than a bore diameter of each of the cylinder liners, that an outer diameter D1 of a first region formed of an outer peripheral surface from a vicinity of a side of the cylinder head to a vicinity of a central portion in a direction of a center line of each of the cylinder liners based on the center line of each of the cylinder liners as a reference be larger than an outer diameter D2 of a second region formed of an outer peripheral surface in a vicinity of a side of the crankcase based on the center line of each of the cylinder liners as a reference, that a level difference that is parallel to an outer peripheral direction and is continuous be formed between the first region and the second region, and that a cooling fluid jacket be formed between the first region and the inner peripheral surface of the hollow portion of the cylinder block main body.

According to still another embodiment of the present invention, in the internal combustion engine, it is preferred that the second connected cylinder have a connected ring-like outer peripheral shape having a ring-like portion with a diameter larger than a bore diameter of each of the cylinder bores, that an outer diameter D1 of a first region formed of an outer peripheral surface from a vicinity of a side of the cylinder head to a vicinity of a central portion in a direction of a center line of each of the cylinder bores based on the center line of each of the cylinder bores as a reference be larger than an outer diameter D2 of a second region formed of an outer peripheral surface in a vicinity of a side of the crankcase based on the centerline of each of the cylinder bores as a reference, that a level difference that is parallel to an outer peripheral direction and is continuous be formed between the first region and the second region, and that a cooling fluid jacket be formed between the first region and the inner peripheral surface of the hollow portion of the cylinder block main body.

According to still another embodiment of the present invention, in the internal combustion engine, it is preferred that a flange portion that partitions the first region into a region on the cylinder head side and a region on the crankcase side be formed on the first region, and that the cooling fluid jacket be divided by the flange portion in a direction of the center line of each of the cylinder liners or each of the cylinder bores.

According to a first aspect of the present invention, provided is a connected cylinder, including: two or more cylinder liners; and a connecting portion configured to connect the two or more cylinder liners to each other, wherein the connected cylinder has a connected ring-like outer peripheral shape having a ring-like portion with a diameter larger than a bore diameter of each of the cylinder liners, wherein an outer diameter D1 of a first region formed of an outer peripheral surface from a vicinity of a cylinder head side to a vicinity of a central portion in a direction of a center line of each of the cylinder liners based on the center line of each of the cylinder liners as a reference is larger than an outer diameter D2 of a second region formed of an outer peripheral surface in a vicinity of a crankcase side based on the center line of each of the cylinder liners as a reference, and wherein a level difference that is parallel to an outer peripheral direction and is continuous is formed between the first region and the second region.

According to a second aspect of the present invention, provided is a connected cylinder, including: a connected cylinder main body portion having two or more cylinder bores; and a coating configured to cover an inner peripheral surface of the connected cylinder main body portion in which the cylinder bores are formed, wherein the connected cylinder has a connected ring-like outer peripheral shape having a ring-like portion with a diameter larger than a bore diameter of each of the cylinder bores, wherein an outer diameter D1 of a first region formed of an outer peripheral surface from a vicinity of a cylinder head side to a vicinity of a central portion in a direction of a center line of each of the cylinder bores based on the center line of each of the cylinder bores as a reference is larger than an outer diameter D2 of a second region formed of an outer peripheral surface in a vicinity of a crankcase side based on the center line of each of the cylinder bores as a reference, and wherein a level difference that is parallel to an outer peripheral direction and is continuous is formed between the first region and the second region.

According to one embodiment of the first and second aspects of the present invention, in the connected cylinder, it is preferred that a flange portion that partitions the first region into a region on the cylinder head side and a region on the crankcase side be formed on the first region.

According to another embodiment of the first and second aspects of the present invention, in the connected cylinder, it is preferred that the first region have no projecting portion.

According to still another embodiment of the first and second aspects of the present invention, in the connected cylinder, it is preferred that the second region have no projecting portion.

Advantageous Effects of Invention

According to the present invention, it is possible to provide a method of manufacturing an internal combustion engine, which provides excellent maintainability and recycling efficiency for an internal combustion engine and a high degree of freedom in design of the internal combustion engine, an internal combustion engine manufactured by using the method, and a connected cylinder to be used therefor.

DESCRIPTION OF EMBODIMENT

Figure 1:
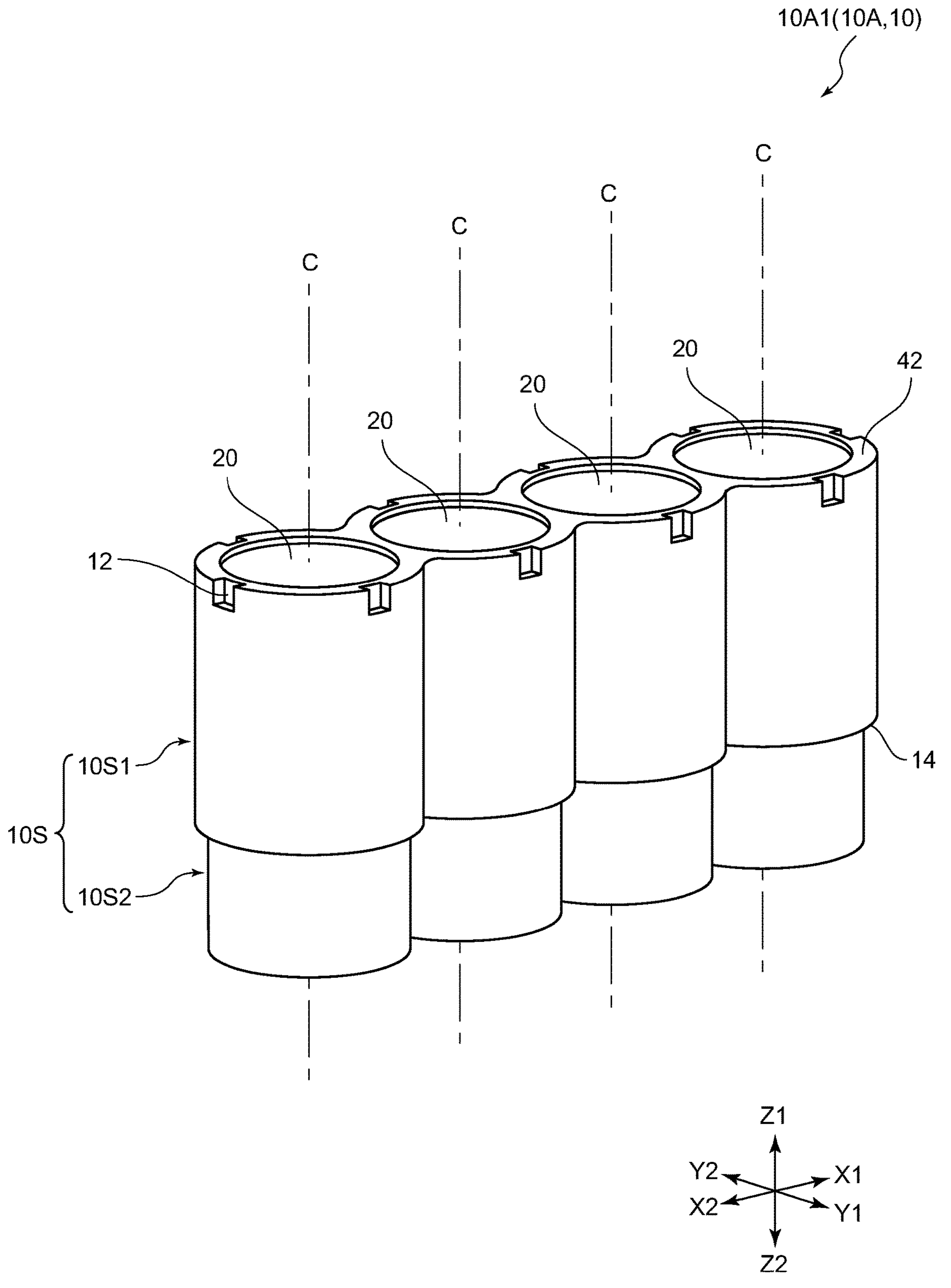
FIG. 1 is an external appearance perspective view for illustrating an example of a first connected cylinder to be used for a method of manufacturing an internal combustion engine according to an embodiment of the present invention.

A method of manufacturing an internal combustion engine, an internal combustion engine, and a connected cylinder according to this embodiment are described below with reference to the drawings. In the following description, an X direction, a Y direction, and a Z direction illustrated in the drawings are orthogonal to each other. In this case, the X direction is a direction of arrangement of cylinder bores. The Y direction is a direction orthogonal to the direction of arrangement of the cylinder bores and to center lines C of the cylinder bores (center lines C of the cylinder bores and cylinder liners in a first connected cylinder). The Z direction is a direction parallel to the center lines C of the cylinder bores. In the X direction, an X1 side is opposite to an X2 side. In the Y direction, a Y1 side is opposite to a Y2 side.

In the Z direction, a Z1 side (cylinder head side) is opposite to a Z2 side (crankcase side).

<Method of Manufacturing Internal Combustion Engine>

In the method of manufacturing an internal combustion engine according to this embodiment, there is used any one of connected cylinders selected from the group consisting of: (1) a first connected cylinder including two or more cylinder liners and a connecting portion configured to connect the two or more cylinder liners to each other; and (2) a second connected cylinder including a connected cylinder main body portion having two or more cylinder bores and coatings configured to cover inner peripheral surfaces of the connected cylinder main body portion in which the cylinder bores are formed.

Figure 2:
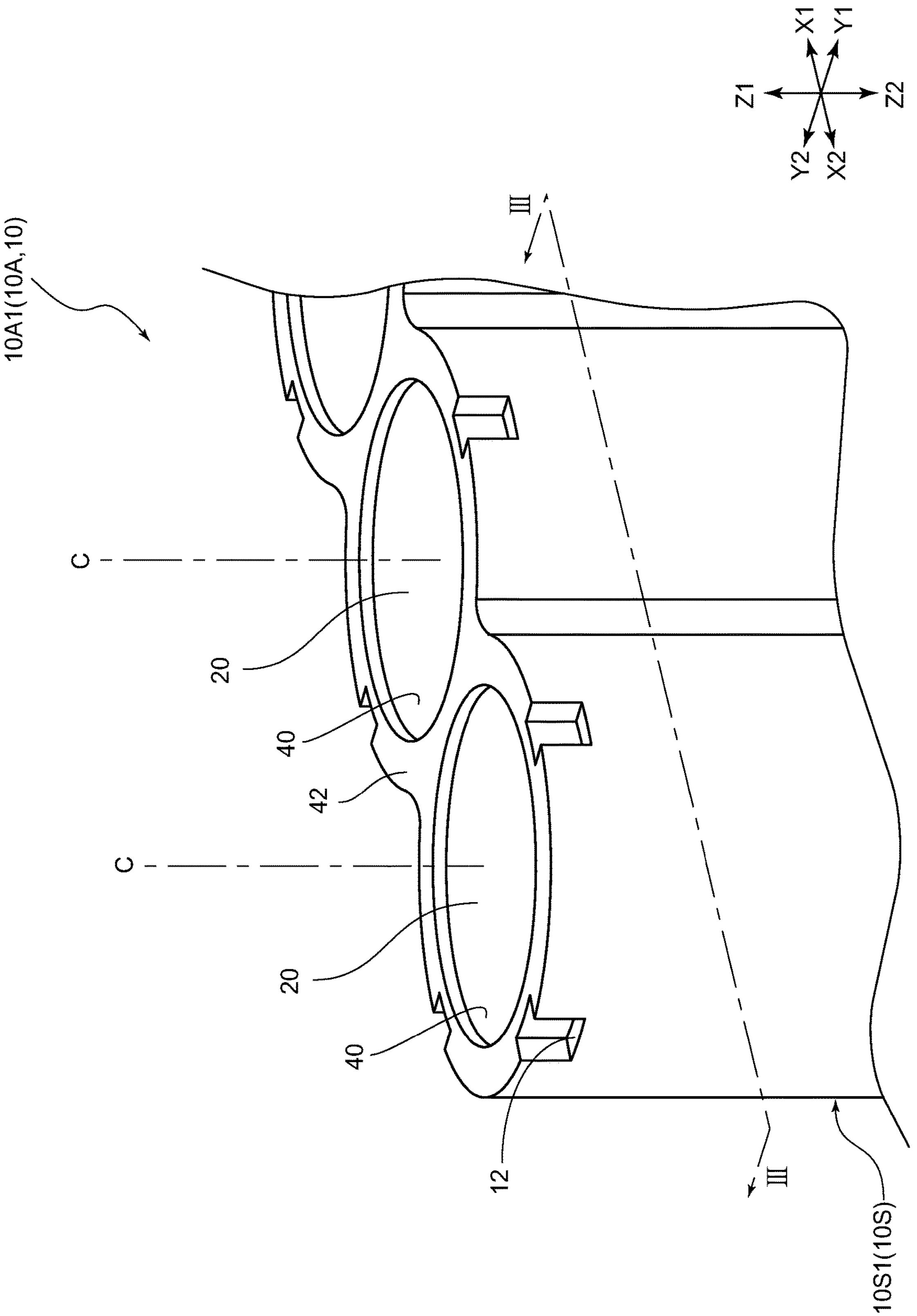
FIG. 2 is an enlarged perspective view of a portion of the first connected cylinder illustrated in FIG. 1, which is located on a cylinder head side.
Figure 3:
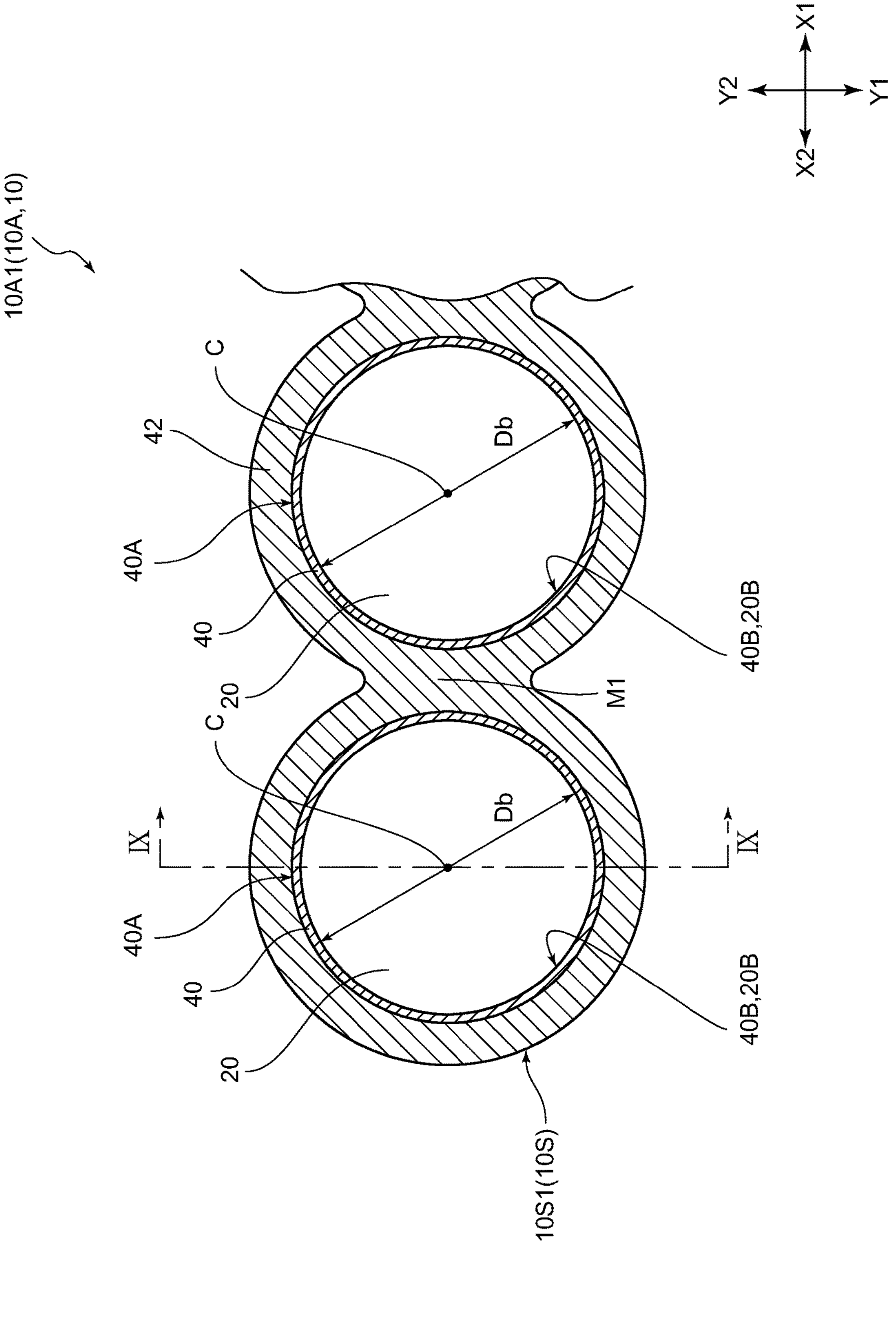
FIG. 3 is an enlarged sectional view for illustrating an example of a sectional structure of the first connected cylinder illustrated in FIG. 2, which is taken along the line III-III.

FIG. 1 to FIG. 3 are schematic views for illustrating an example of a connected cylinder to be used for a method of manufacturing an internal combustion engine according to this embodiment, more specifically, views for illustrating an example of the first connected cylinder. In the drawings, FIG. 1 is an external appearance perspective view of the first connected cylinder, and FIG. 2 is an enlarged perspective view of a portion of the first connected cylinder, which is located on the cylinder head side. FIG. 3 is an enlarged sectional view for illustrating an example of a sectional structure of the portion of the first connected cylinder, which is located on the cylinder head side, and for illustrating a sectional structure (XY sectional structure) of the first connected cylinder illustrated in FIG. 2, which is taken along the line III-III.

A first connected cylinder 10A1 (10A, 10) exemplified in FIG. 1 to FIG. 3 includes four cylinder bores 20. The cylinder bores 20 are formed along the X direction so that center lines C thereof are located on the same plane (XZ plane). The first connected cylinder 10A1 includes four cylinder liners 40 and a connecting portion 42 configured to connect the four cylinder liners 40 to each other. In the example illustrated in FIG. 1 to FIG. 3, the connecting portion 42 is provided so as to cover at least entire outer peripheral surfaces 40A of the four cylinder liners 40 each having a cylindrical shape, and has a connected ring-like outer peripheral shape having ring-like portions each with a diameter obtained by increasing a bore diameter Db of each of the cylinder liners 40. One of the cylinder liners 40 and another of the cylinder liners 40, which are adjacent to each other in the X direction, are arranged to be spaced away from each other by a given distance so that the outer peripheral surfaces 40A thereof do not come into contact with each other. Specifically, a space between the two adjacent cylinder liners 40 is filled with a material that forms the connecting portion 42 without a gap. A cylinder head-side end surface and a crankcase-side end surface of each of the cylinder liners 40 are covered with the connecting portion 42. Any one or both of the cylinder head-side end surface and the crankcase-side end surface of each of the cylinder liners 40 are not required to be covered with the connecting portion 42.

Figure 4:
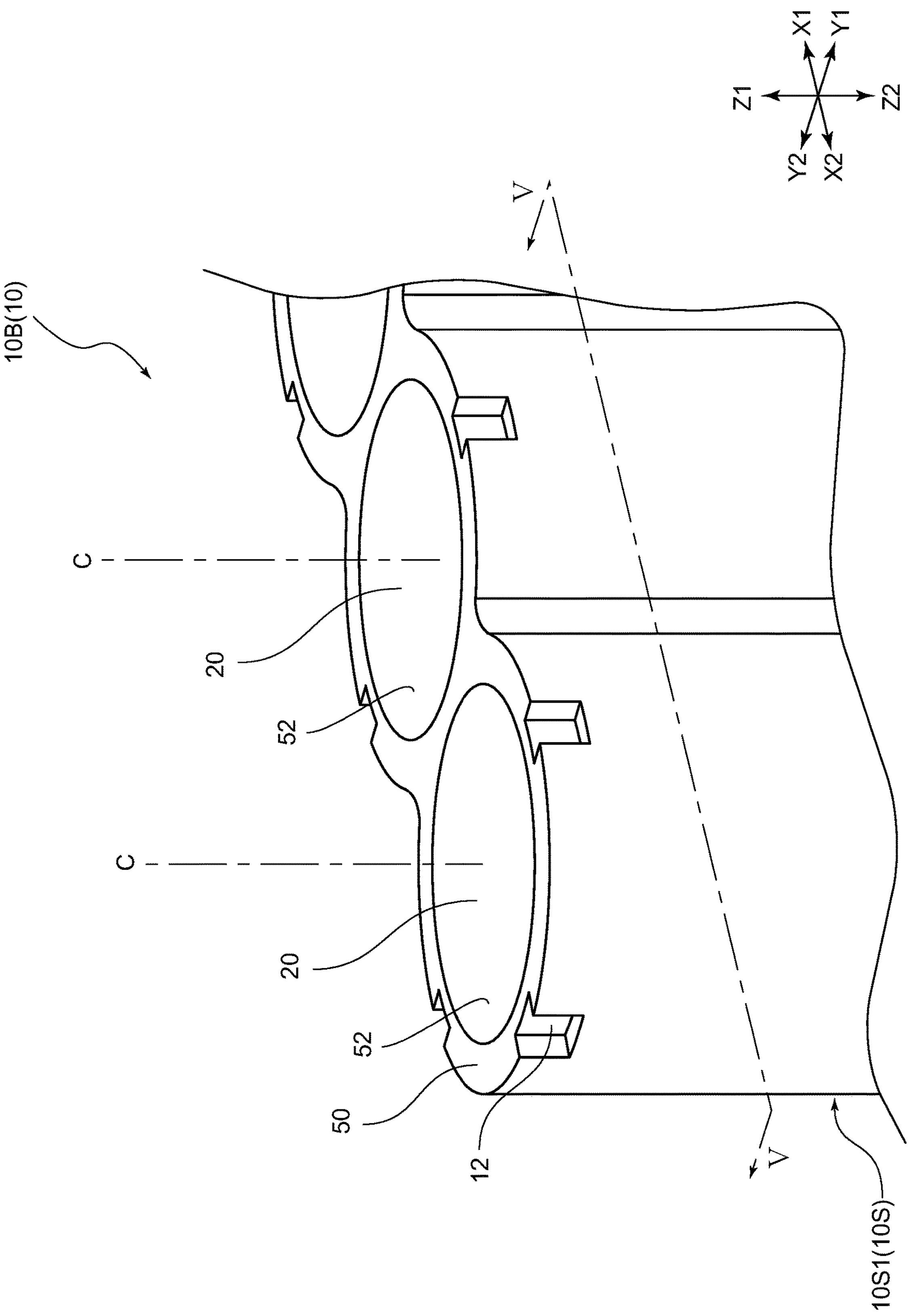
FIG. 4 is an enlarged perspective view for illustrating an example of a portion of a second connected cylinder, which is located on the cylinder head side, to be used for the method of manufacturing an internal combustion engine according to the embodiment.
Figure 5:
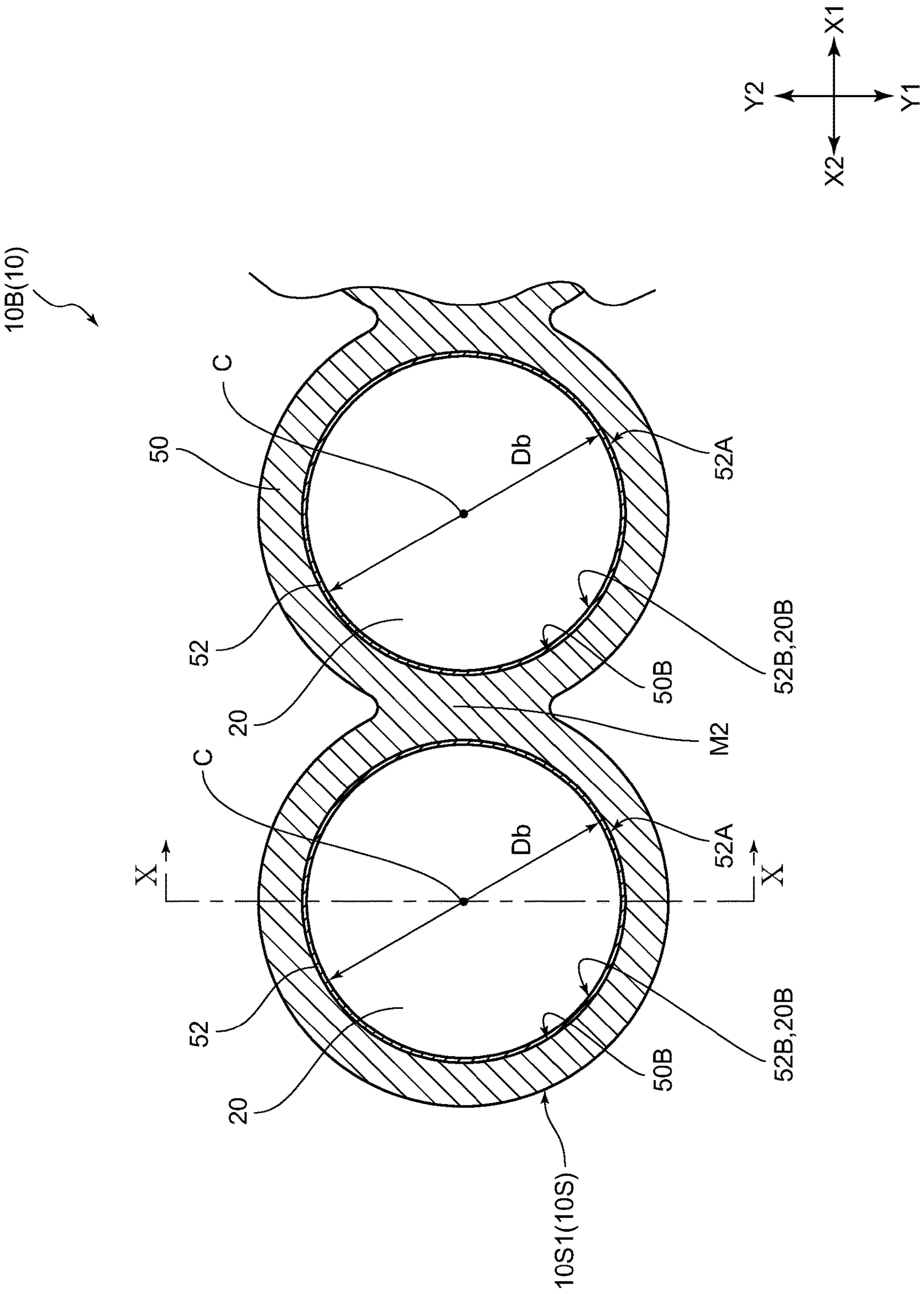
FIG. 5 is an enlarged sectional view for illustrating an example of a sectional structure of the second connected cylinder illustrated in FIG. 4, which is taken along the line V-V.

FIG. 4 and FIG. 5 are schematic views for illustrating another example of the connected cylinder to be used for the method of manufacturing an internal combustion engine according to this embodiment, more specifically, views for illustrating an example of the second connected cylinder. FIG. 4 is an enlarged perspective view of a portion of the second connected cylinder, which is located on the cylinder head side. FIG. 5 is an enlarged sectional view for illustrating an example of a sectional structure of the portion of the second connected cylinder, which is located on the cylinder head side, and is a view for illustrating a sectional structure (XY sectional structure) of the connected cylinder illustrated in FIG. 4, which is taken along the line V-V.

An outer peripheral shape of a second connected cylinder 10B (10) exemplified in FIG. 4 and FIG. 5 is similar to that of the first connected cylinder 10A1 exemplified in FIG. 1. The second connected cylinder 10B also has the four cylinder bores 20. The cylinder bores 20 are arranged along the X direction so that the center lines C thereof are located on the same plane (XZ plane). The second connected cylinder 10B includes a connected cylinder main body portion 50 having the four cylinder bores 20 and coatings 52 configured to cover inner peripheral surfaces 50B of the connected cylinder main body portion 50 in which the cylinder bores 20 are formed. In the example illustrated in FIG. 4 and FIG. 5, the connected cylinder main body portion 50 has a connected ring-like outer peripheral shape having ring-like portions each with a diameter obtained by increasing the bore diameter Db of each of the four cylinder bores 20 each having a circular hole shape.

Although the first connected cylinder 10A1 exemplified in FIG. 1 to FIG. 3 includes the four cylinder liners 40, the number of cylinder liners 40 is not particularly limited as long as the number of cylinder liners 40 is two or more. In general, the number of cylinder liners 40 can be selected within a range of from 2 to 8. Although the second connected cylinder 10B exemplified in FIG. 4 and FIG. 5 has the four cylinder bores 20, the number of cylinder bores 20 is not particularly limited as long as the number of cylinder bores 20 is two or more. In general, the number of cylinder bores 20 can be selected within a range of from 2 to 8.

With the method of manufacturing an internal combustion engine according to this embodiment, an internal combustion engine is manufactured at least through a fitting step of fitting the connected cylinder 10 as exemplified in FIG. 1 to FIG. 5 to a cylinder block main body.

Figure 6:
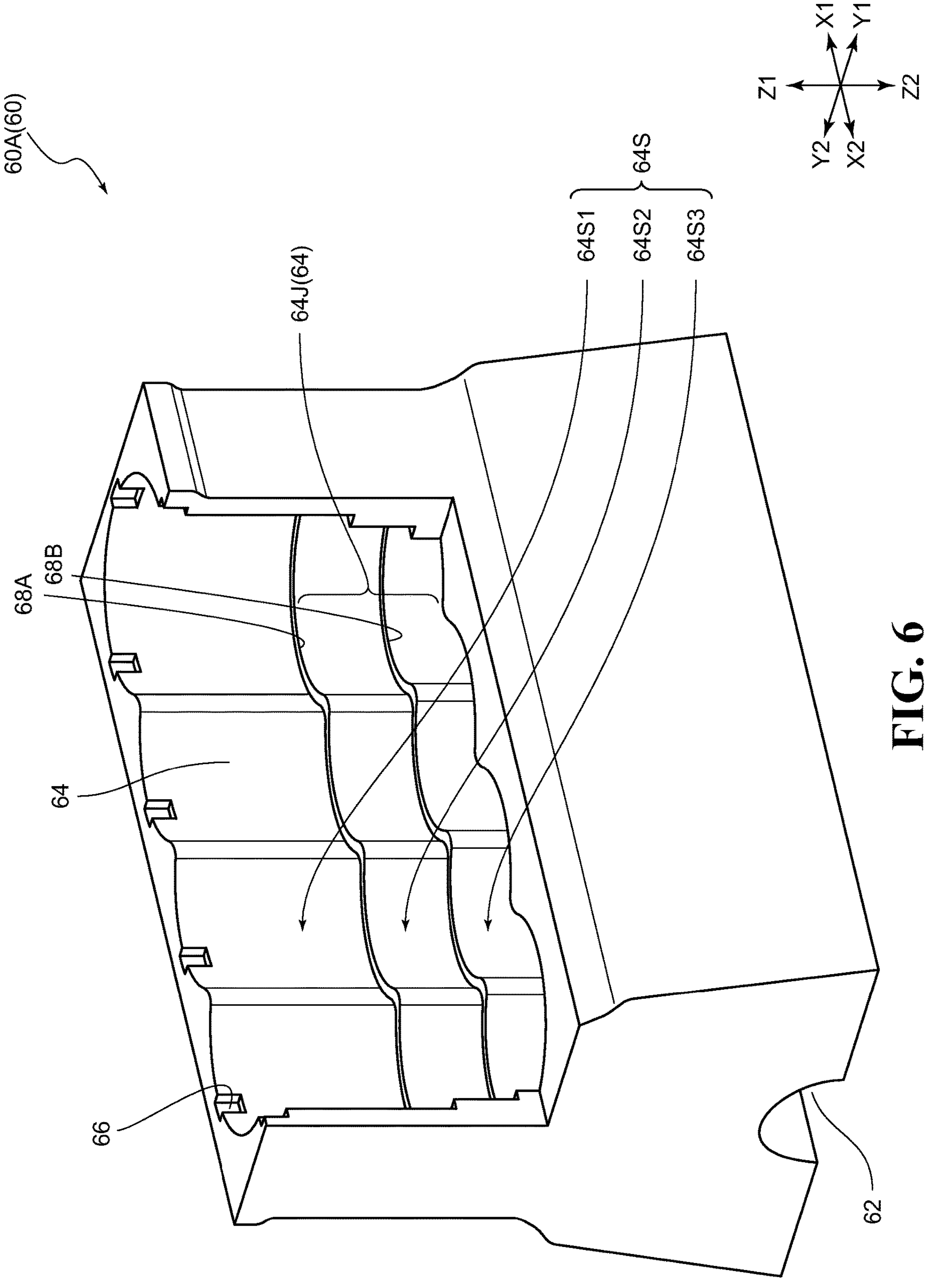
FIG. 6 is an exploded perspective view for illustrating part of a cylinder block main body in a broken manner for an example of the cylinder block main body to be used for the method of manufacturing an internal combustion engine according to the embodiment.

As exemplified in FIG. 6, a cylinder block main body 60A (60) has a structure having one end side (Z2 side) where a crankcase 62 is formed, another end side (Z1 side) where a cylinder head is attachable, and a hollow portion 64 passing through cylinder block main body 60A (60) from the one end side to the another end side. In the fitting step, the connected cylinder 10 is fitted to the hollow portion 64. After the fitting step is carried out, various other steps are carried out to complete the internal combustion engine. As the other steps, there is given, for example, a step of assembling the cylinder head on the cylinder head side (Z1 side) of the cylinder block main body 60 in which the connected cylinder 10 fitted and fixed to the hollow portion 64 is arranged.

Figure 7:
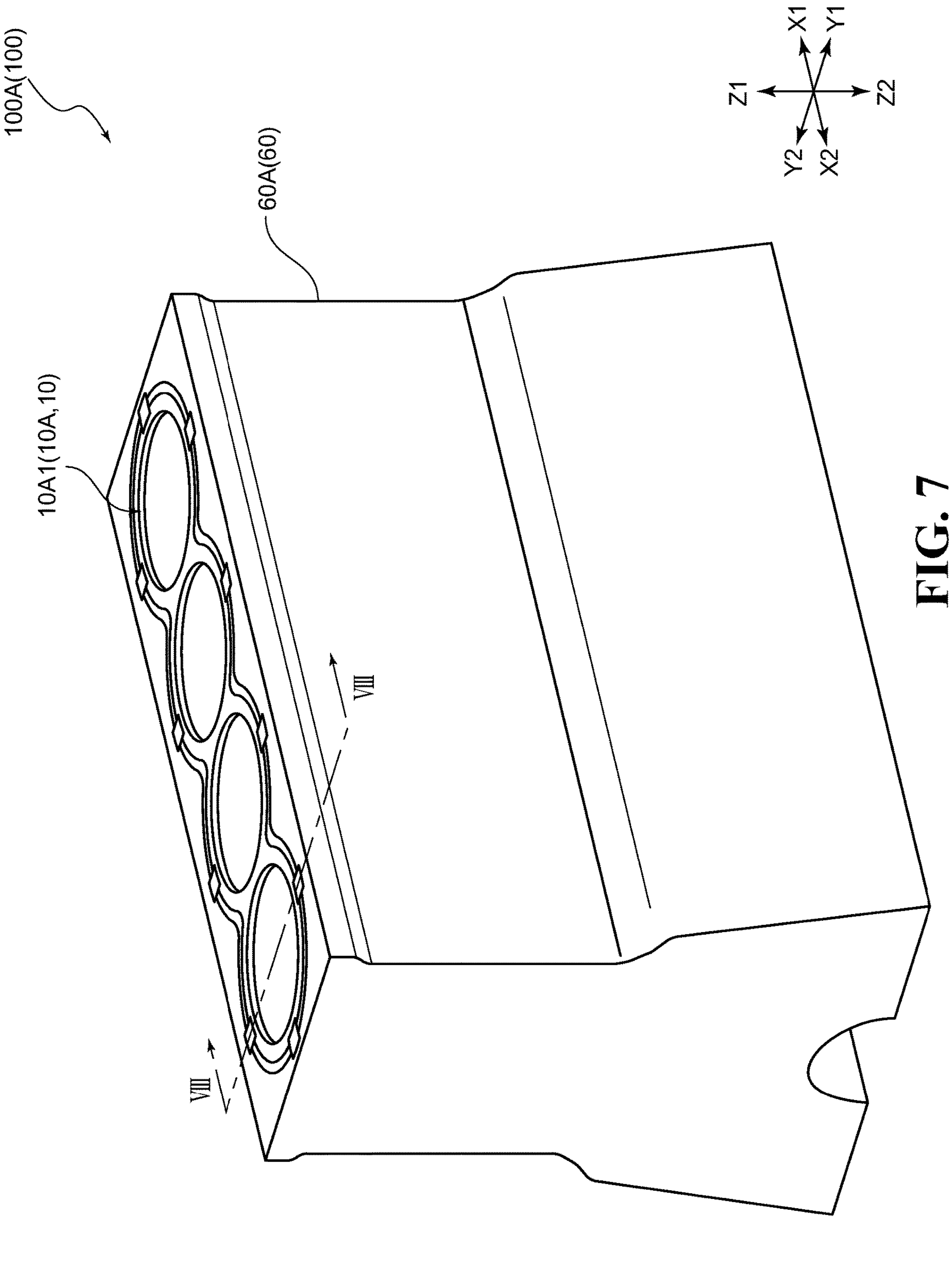
FIG. 7 is an external appearance perspective view for illustrating an example of an internal combustion engine using the first connected cylinder that is manufactured by the method of manufacturing an internal combustion engine according to the embodiment.
Figure 8:
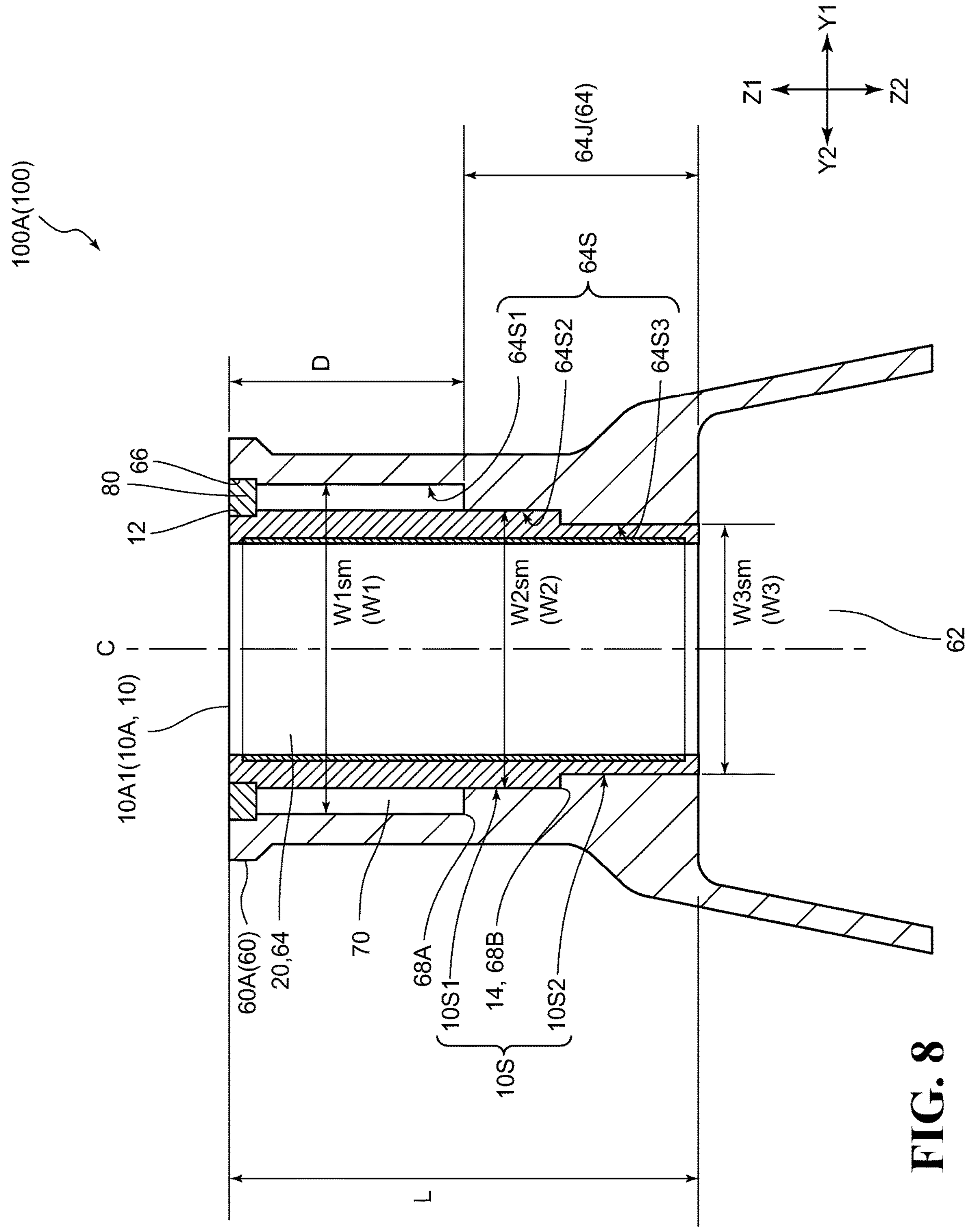
FIG. 8 is a schematic sectional view for illustrating an example of a sectional structure of the internal combustion engine illustrated in FIG. 7, which is taken along the line VIII-VIII.

FIG. 7 is an external appearance perspective view for illustrating an example of an internal combustion engine manufactured by the method of manufacturing an internal combustion engine according to this embodiment, and FIG. 8 is a schematic sectional view for illustrating an example of a sectional structure (YZ sectional structure) of the internal combustion engine illustrated in FIG. 7, which is taken along the line VIII-VIII. In the internal combustion engine illustrated in FIG. 7 and FIG. 8, illustration is omitted for main components other than the connected cylinder and the cylinder block main body, which construct the internal combustion engine.

An internal combustion engine 100A (100) illustrated in FIG. 7 and FIG. 8 includes the connected cylinder 10 and the cylinder block main body 60. The connected cylinder 10 is removably fitted to a one end-side portion (fitting portion 64J) of the hollow portion 64 of the cylinder block main body 60. Although the first connected cylinder 10A1 exemplified in FIG. 1 to FIG. 3 is used as the connected cylinder

10 in the example illustrated in FIG. 7 and FIG. 8, the second connected cylinder 10B or the connected cylinder 10 having a flange portion 16 as exemplified in FIG. 11 referred to later can be used in place of the first connected cylinder 10A1. In the example illustrated in FIG. 7 and FIG. 8, the cylinder block main body 60A is used as the cylinder block main body 60. When the connected cylinder 10 having the flange portion 16 is used, however, a cylinder block main body 60B (60) as exemplified in FIG. 13 referred to later can also be used.

Meanwhile, in a general internal combustion engine having a structure in which a plurality of cylinder liners are casted into a cylinder block, an entire main part of the internal combustion engine, which includes the cylinder liners and the cylinder block, is required to be handled even when repair and replacement work is required for only part of the internal combustion engine. In addition, in the general internal combustion engine, a plurality of, that is, two or more kinds of materials having different material properties (for example, a material that forms the cylinder liners and a material that forms the cylinder block having the cylinder liners casted therein) are formed integrally and inseparably. Therefore, when a recycling process is required to be performed for each of the kinds of materials, the materials are required to be separated for each of the kinds of materials by using a difference in melting temperature between the materials. The same applies to an internal combustion engine disclosed in Patent Literature 1, which has a structure in which a group of the cylinder liners is casted into the cylinder block main body.

Meanwhile, in the method of manufacturing an internal combustion engine according to this embodiment, as exemplified in FIG. 7 and FIG. 8, the connected cylinder 10 is fixed to the cylinder block main body 60 by fitting the connected cylinder 10 to the hollow portion 64. Therefore, even after being fixed to the cylinder block main body 60, the connected cylinder 10 can be easily removed from the cylinder block main body 60. Therefore, when the internal combustion engine 100 is subjected to maintenance, the connected cylinder 10 is removed from the cylinder block main body 60 so that any one or both of the connected cylinder 10 and the cylinder block main body 60 can be repaired or replaced individually. Therefore, the internal combustion engine 100 manufactured by the method of manufacturing an internal combustion engine according to this embodiment is excellent in maintainability.

In addition, when the internal combustion engine 100 is to be disposed of, the connected cylinder 10 and the cylinder block main body 60, which are main components constructing the internal combustion engine 100, can be easily separated so as to be disposed of separately. In this case, the cylinder block main body 60, which is to be used for the method of manufacturing an internal combustion engine according to this embodiment, is generally formed of a member (member which is entirely integral and inseparable and is made of one kind of material) produced by using casting, resin molding, or other methods.

Therefore, the cylinder block main body 60, which is removed from the internal combustion engine 100, can be directly subjected to the recycling process without being subjected to, for example, further separation process. For example, when the cylinder block main body 60 is a cast that is manufactured using an aluminum alloy, cast iron, or other materials, the cylinder block main body 60 can be subjected to a dissolution treatment to be reused. Therefore, the internal combustion engine 100 manufactured by the method of manufacturing an internal combustion engine according to this embodiment is also excellent in recycling efficiency. Although it is particularly preferred that the cylinder block main body 60 be generally formed of an entirely integral and inseparable member made of a single kind of material, a structure of the cylinder block main body 60 is not limited to that in a case in which the cylinder block main body 60 is formed of an entirely integral and inseparable member made of a single kind of material as long as the cylinder block main body 60 has substantially the same degree of recycling efficiency as that of the member described above.

When any one of the members which construct the internal combustion engine 100 to be disposed of, that is, the connected cylinder 10 and the cylinder block main body 60, is satisfactorily reusable, the one member may be reused and only another of the members may be disposed of.

With a general related-art method of manufacturing an internal combustion engine in which the cylinder liners and the cylinder block are integrated by cast-in of the cylinder liners with a casting material, a whole member obtained by integrating the cylinder liners and the cylinder block is required to be disposed of even when a defect is found only in a portion of the cylinder liners or a portion in the vicinity thereof or a defect is found only in the cylinder block after casting. Meanwhile, with the method of manufacturing an internal combustion engine according to this embodiment, the two components (the connected cylinder 10 and the cylinder block main body 60) are prepared separately and are then combined to manufacture the internal combustion engine 100. Thus, even when a defective failure is found in any of the components after a fitting step, only the component in which the defective failure has been found is to be disposed of. Thus, in other words, even when a defective failure occurs, disposal loss in a manufacturing process can be reduced.

The internal combustion engine is required to satisfy various performances such as an output, fuel efficiency, and small-size and lightweight properties in accordance with requirement specifications of a vehicle or apparatus other than the vehicle, for which the internal combustion engine is used. In addition, particularly important characteristics for the internal combustion engine, such as the output and the fuel efficiency, tend to be greatly affected by a material property and a structure of a portion in the vicinity of the cylinder bores. Thus, it is important for the internal combustion engine to have a high degree of freedom in design, in particular, a high degree of freedom in design in the vicinity of a central portion (in the vicinity of the cylinder bores) of the internal combustion engine so that various performances can be flexibly satisfied.

Meanwhile, the connected cylinder 10 to be used for the method of manufacturing an internal combustion engine according to this embodiment has a main part formed of a combination of two kinds of members. Specifically, the first connected cylinder 10A has a main part formed of a combination of the cylinder liners 40 and the connecting portion 42, whereas the second connected cylinder 10B has a main part formed of a combination of the connected cylinder main body portion 50 and the coatings 52. Therefore, the various performances in accordance with the required specifications of the vehicle or the apparatus other than the vehicle, for which the internal combustion engine is used, are easily satisfied by appropriately changing the combination of material properties and shapes of the two kinds of members. In addition, even for the whole internal combustion engine 100, a main part thereof is formed of the connected cylinder 10 and the cylinder block main body 60, which are members separate from and independent of each other. Therefore, it is easy to satisfy the various performances in accordance with the required specifications of the vehicle or the apparatus other than the vehicle, for which the internal combustion engine is used, by appropriately changing the combination of material properties and shapes of the above-mentioned two kinds of members.

Thus, in comparison to a general internal combustion engine having a structure in which the cylinder liners and the cylinder block are formed integrally and inseparably by casting the cylinder liners into the cylinder block, and the internal combustion engines disclosed in Patent Literature 1 and Patent Literature 2, each having a structure in which the plurality of cylinder liners are integrally formed and the group of cylinder liners formed of one member is used, the internal combustion engine 100 manufactured by the method of manufacturing an internal combustion engine according to this embodiment has a high degree of freedom in design. Therefore, the internal combustion engine 100 can easily meet a wide variety of required specifications.

The internal combustion engine 100 is not limited to that manufactured according to specific design specifications, and can be flexibly designed based on various required specifications or technical concepts. As design examples of the internal combustion engine 100, the following design examples can be exemplified as basic technical concepts.

(Design Example 1)

a) As the connected cylinder 10 to be used for the internal combustion engine 100, the first connected cylinder 10A is to be used.

b) As a material that forms the cylinder liners 40, a material that is excellent in sliding characteristics (wear resistance, seizing resistance, a low friction property) relative to those of the connecting portion 42 is to be used.

c) As a material that forms the connecting portion 42, a material having a low density (lightweight) and a high thermal conductivity (heat dissipation property) relative to those of the material that forms the cylinder liners 40 is to be used.

In Design Example 1, the internal combustion engine 100 excellent in sliding characteristics, lightweight property, and heat dissipation property can be provided.

(Design Example 2)

a) As the connected cylinder 10 to be used for the internal combustion engine 100, the first connected cylinder 10A is to be used.

b) As a material that forms the connecting portion 42, a material having a large strength is to be used.

In Design Example 2, the strength of the connecting portion 42 is increased. Therefore, a reduction in thickness of the cylinder liners 40 and a reduction in thickness of a portion between two adjacent ones of the cylinder bores 20 are facilitated. Consequently, the internal combustion engine 100 can be reduced in weight. Alternatively, in a case in which the thickness of the portion between the two adjacent cylinder bores 20 is not reduced, when a cooling medium flow passage is formed between the two adjacent cylinder bores 20, a capacity of the cooling medium flow passage can be increased while the strength required for the first connected cylinder 10A is ensured. Further, deformation of the bores due to an increase in in-cylinder pressure, which is caused by engine combustion, can be prevented.

(Design Example 3)

As the connected cylinder 10 to be used for the internal combustion engine 100, the second connected cylinder 10B is to be used.

In Design Example 3, the sliding characteristics can be ensured by the coatings 52 having a such mass that is substantially negligibly smaller than that of the cylinder liners 40. Therefore, in the internal combustion engine, a mass of a portion formed of the second connected cylinder 10B can be easily significantly reduced in comparison to a structural portion in the vicinity of a portion in which the cylinder bores are arranged in array, specifically, a portion including the cylinder liners and a cast member that covers the cylinder liners in a general related-art internal combustion engine or a portion formed of the first connected cylinder 10A including the cylinder liners 40 and the connecting portion 42 that is provided so as to cover the entire outer peripheral surfaces 40A of the cylinder liners 40 as exemplified in FIG. 1 to FIG. 3. Thus, the internal combustion engine 100 can be remarkably reduced in weight.

Next, the connected cylinder 10 and the cylinder block main body 60, which are to be used for the method of manufacturing an internal combustion engine according to this embodiment, are described.

First, in the first connected cylinder 10A, the two or more cylinder liners 40 and the connecting portion 42 may be formed integrally and inseparably, or may be formed so as to be removable from each other. Further, the connecting portion 42 may be provided so as to cover the entire outer peripheral surfaces 40A of the cylinder liners 40 as exemplified in FIG. 1 to FIG. 3, or may be provided so as to cover only part of the outer peripheral surfaces 40A of the cylinder liners 40. A selection and a combination of the above-mentioned modes can be appropriately selected in accordance with the required specifications of the internal combustion engine 100 to be manufactured.

For example, by a) a method of arranging the two or more cylinder liners 40 in the die and then pouring a molten metal into the die to cast the two or more cylinder liners 40 with a casting material such as cast iron or an aluminum alloy, or by b) resin molding for injecting or pouring a resin material in a molten state into the die after arranging the two or more cylinder liners 40 in the die, the first connected cylinder 10A in which the two or more cylinder liners 40 and the connecting portion 42 are formed integrally and inseparably can be obtained. In this case, through appropriate selection of a shape of the die, the connecting portion 42 can cover the entire outer peripheral surfaces 40A of the cylinder liners 40 and can also cover only part of the outer peripheral surfaces 40A of the cylinder liners 40.

The connecting portion 42 has two or more circular through holes, and the cylinder liners 40 are fitted and fixed to the through holes of the connecting portion 42 having the connected ring shape in which center lines of the through holes are parallel to each other. As a result, the first connected cylinder 10A in which the two or more cylinder liners 40 and the connecting portion 42 are formed so as to be removable from each other can also be obtained. In this case, for example, through appropriate selection of a length of the connecting portion 42 in a direction of the center lines, the connecting portion 42 can cover the entire outer peripheral surfaces 40A of the cylinder liners 40 and can also cover only part of the outer peripheral surfaces 40A of the cylinder liners 40.

However, it is preferred that the connecting portion 42 be formed by casting rather than by using a member that is formed in advance to have a connected ring shape. In this case, the number of components can be reduced at the time of manufacture of the first connected cylinder 10A. In addition, as compared to a case in which the member that is formed in advance to have the connected ring shape is used as the connecting portion 42, a heat transfer resistance at interfaces between the connecting portion 42 and the cylinder liners 40 can be reduced in a case in which the connecting portion 42 is formed integrally with and inseparably from the cylinder liners 40 by casting. Thus, it is easy to improve cooling performance of the internal combustion engine 100.

A thickness of each of the cylinder liners 40 can be appropriately selected and generally falls within a range of from about 1.5 mm to about 4.0 mm. Moreover, more preferred shape and structure of the connected cylinder 10 are described later.

Meanwhile, for the second connected cylinder 10B, for example, after the connected cylinder main body portion 50 is produced by casting, the coatings 52 are film-formed so as to cover the inner peripheral surfaces 50B of the connected cylinder main body portion 50, in which the cylinder bores 20 are formed. For the film formation of the coatings 52, a commonly known film-formation method such as a spraying method can be appropriately used. A thickness of each of the coatings 52 can be appropriately selected and generally falls within a range of from about 0.02 mm to about 0.2 mm. In this case, when, for example, the spraying method is adopted as the film-formation method for the coatings 52, it is preferred that the thickness of each of the coatings 52 fall within a range of from about 0.1 mm to about 0.2 mm. When a physical vapor deposition (PVD) method or a chemical vapor deposition (CVD) method is adopted as the film-formation method for the coatings 52, it is preferred that the thickness of each of the coatings 52 fall within a range of from about 0.02 mm to about 0.03 mm.

Although a material that forms the connecting portion 42 may be the same as a material that forms the cylinder block main body 60 in the first connected cylinder 10A, it is particularly preferred that the material that forms the connecting portion 42 be different from the material that forms the cylinder block main body 60. Similarly, although a material that forms the connected cylinder main body portion 50 may be the same as the material that forms the cylinder block main body 60 in the second connected cylinder 10B, it is particularly preferred that the material that forms the connected cylinder main body portion 50 be different from the material that forms the cylinder block main body 60.

In the specification of this application, as "two kinds of materials different from each other", there are exemplified: a) a case in which compositions of the respective materials are fundamentally different, as in the case of an aluminum alloy and steel, b) a case in which, for materials based on the same composition, for example, for two kinds of aluminum alloys, quantitative compositions are different as in a case in which one aluminum alloy contains a larger amount of Al and another of the aluminum alloys contains a smaller amount of Al, c) a case in which, for materials which are based on the same composition and have the same quantitative composition, there is a difference in crystalline-amorphous degree, in kind of crystalline phase, or in other organizational structure between one of the materials and another of the materials, or d) a case in which, although one of the materials and another of the materials contain the same substance X, one of the materials is a single material containing only the substance X and another of the materials is a composite material containing another substance Y in addition to the substance X as in a case of a plastic and a fiber-reinforced plastic.

A material different from the material that forms the cylinder block main body 60 is used as a material that forms a main part of the connected cylinder 10 (the connecting portion 42 in the first connected cylinder 10A, the connected cylinder main body portion 50 in the second connected cylinder 10B). As a result, the degree of freedom in design of the whole internal combustion engine 100 can be further improved. Therefore, it becomes extremely easy to manufacture the internal combustion engine 100 having various specifications as exemplified in the following items (1) to (3).

(1) The internal combustion engine 100 having such specifications that the cylinder block main body 60 is reduced in cost and weight, which is achieved by using a material having a high rigidity relative to that of the cylinder block main body 60 as the material that forms a main part of the connected cylinder 10.

(2) The internal combustion engine 100 having specifications with a reduced burden on a cooling system under a high load, which is achieved by using a material having a high thermal conductivity relative to that of the main part of the connected cylinder 10 as the material that forms the cylinder block main body 60.

(3) The internal combustion engine 100 having specifications with improved fuel efficiency, which is achieved by advancing a temperature rise of a cooling fluid under a low load and warm-up by using a material having a low thermal conductivity relative to that of the main part of the connected cylinder 10 as the material that forms the cylinder block main body 60.

As the material that forms the connecting portion 42 or the connected cylinder main body portion 50, there are given, for example, an aluminum alloy (preferably, a high rigidity type aluminum alloy), a magnesium alloy, and steel. As the material that forms the cylinder block main body, there are exemplified an aluminum alloy, a magnesium alloy, and a resin.

As the material that forms the cylinder liners 40, there is exemplified a cast iron material such as flake graphite cast iron. As the material that forms the coatings 52, various commonly known hard materials can be used without restriction. For example, when the coatings 52 are film-formed by the spraying method, there are exemplified Fe-based materials and WC-based materials. When the coatings 52 are film-formed by the PVD method or the CVD method, there are exemplified C-based materials and Cr-based materials. Further, a layer structure of each of the coatings 52 is not particularly limited, and may be, for example, a single-layer structure or may be a laminate structure formed by combining different kinds of materials or different kinds of crystal phases.

Meanwhile, a structure of the cylinder block main body 60 to be used for the method of manufacturing an internal combustion engine according to this embodiment is not particularly limited as long as the cylinder block main body 60 has such a structure having one end side where the crankcase 62 is formed and another end side where the cylinder head is attachable, and the hollow portion 64 passing through the cylinder block main body 60 from the one end side to the another end side so that the connected cylinder 10 can be fitted to the hollow portion 64, as exemplified in FIG. 6 to FIG. 8. Further, although the cylinder block main body 60 can be manufactured by appropriately using a commonly known method, it is preferred that the cylinder block main body 60 be manufactured by casting or resin molding. As a specific example of the manufacturing method other than the casting and the resin molding, there are exemplified a hot-pressing process or a hot isostatic pressing (HIP) process, which uses base powder, and a laser sintering process of alternately repeating lamination of layers made of base powder and laser sintering. In this case, the manufacture of the cylinder block main body 60 by the casting or the resin molding has advantages described below.

First, when the member is manufactured by the casting, volume contraction occurs in a process of cooling the molten metal poured into the die. Therefore, as a volume of the member increases, a defect such as formation of a blow hole is liable to occur. Meanwhile, as compared to the related-art method of manufacturing an internal combustion engine, in which the cylinder block is formed by casting the cylinder liners with the aluminum alloy or other materials, the internal combustion engine 100 is manufactured by mechanically fitting the connected cylinder 10 and the cylinder block main body 60, which have been manufactured individually and independently of each other, with the method of manufacturing an internal combustion engine of this embodiment. Therefore, as compared to a volume of a cylinder block of a related-art internal combustion engine, the volume of the cylinder block main body 60 can be significantly reduced. Thus, when the cylinder block main body 60 is manufactured by the casting, it becomes easy to prevent occurrence of the defect such as formation of the blow hole, which is caused by the volume contraction. In addition, in comparison to the case in which the cylinder block of the related-art internal combustion engine is casted, various countermeasures (for example, keeping a thickness of the member manufactured by the casting as constant as possible) against the defects described above are not required to be actively adopted. Therefore, the degree of freedom in design can be further increased for the shape, the structure, and a casting process of the cylinder block main body 60. For example, as compared to a cooling fluid jacket provided to the cylinder block for the related-art internal combustion engine, it is significantly easy to form the cooling fluid jacket having a smaller depth from the another end side when the cooling fluid jacket is provided to the cylinder block main body 60 or when the cooling fluid jacket is provided between an inner peripheral surface 64S of the hollow portion 64 of the cylinder block main body 60 and an outer peripheral surface 10S of the connected cylinder 10. The same substantially applies even to a case in which the cylinder block main body 60 is manufactured by the resin molding with which the volume contraction occurs in a process of cooling a resin material in a molten state, which is injected or poured into the die.

In the method of manufacturing an internal combustion engine according to this embodiment, various steps other than the fitting step, such as a step of assembling various components such as the cylinder head after the connected cylinder 10 is mounted to the cylinder block main body 60, a sliding surface formation step of forming a sliding surface through finishing of the inner peripheral surfaces of the cylinder bores 20, such as honing, lapping, or dimple formation, or a step of forming the cooling fluid passage between two adjacent ones of the cylinder bores 20 in the connected cylinder 10 can be appropriately carried out as needed.

In the specification of this application, the "sliding surface" corresponds to a surface that slides in contact with a piston or a piston ring mounted in a groove formed in an outer peripheral surface of the piston when the internal combustion engine 100 in a completed state is operated. The sliding surface is a surface that is finished for purposes of improvement of the seizing resistance and reduction of oil consumption amount. Further, once the formation of the sliding surface is completed in a manufacturing process of the internal combustion engine 100, the sliding surface is not subjected to further finishing.

The sliding surface may be formed by performing finishing only once on each of the inner peripheral surfaces of the cylinder bores 20 or may be formed by performing finishing thereon for a plurality of times. When the sliding surface is formed by performing finishing for the plurality of times, the "sliding surface" corresponds only to a surface that is formed after the last finishing is performed. A step of performing the last finishing is referred to as "sliding surface formation step". Further, a step of performing the finishing (from first finishing to second to last finishing) other than the last finishing is referred to as "roughly finished surface formation step".

The sliding surface has various surface geometries depending on a finishing method, and the surface geometries are not particularly limited. For a surface shape, for example, there is given a cross-hatched shape (surface on which net-like thin streaks or grooves or oblique-parallel linear thin streaks or grooves are formed). For a surface roughness, there is exemplified an arithmetic average roughness Ra falling within a range of from about 0.1 μm to about 0.8 μm.

The sliding surface formation step of forming the sliding surfaces by finishing inner peripheral surfaces 20B of the cylinder bores 20 can be carried out at freely-selected timing in the manufacturing process of the internal combustion engine 100. The timing of carrying out the sliding surface formation step is roughly classified as: (I) the sliding surface formation step carried out before the fitting step; and (II) the sliding surface formation step carried out after the fitting step. In each of the processes (I) and (II) described above, another step may be carried out between the fitting step and the sliding surface formation step as needed.

(I) As a case in which the sliding surface formation step is carried out before the fitting step, for example, the following three modes are given. First, when the connected cylinder 10 is the first connected cylinder 10A, (Ia) the sliding surface formation step of forming the sliding surface by finishing each of the inner peripheral surfaces 40B of the cylinder liners 40 is carried out only before the fitting step, or (Ib) after a coating formation step of forming a coating on each of the inner peripheral surfaces 40B of the cylinder liners 40 is carried out, the sliding surface formation step of forming the sliding surface by finishing a surface of the coating can be carried out, and the sliding surface formation step can be carried out only before the fitting step. When the connected cylinder 10 is the second connected cylinder 10B, (Ic) the sliding surface formation step of forming the sliding surface by finishing a surface 52B of each of the coatings 52 that cover the inner peripheral surfaces 50B of the connected cylinder main body portion 50 in which the cylinder bores 20 are formed can be carried out only before the fitting step.

(II) As a case in which the sliding surface formation step is carried out after the fitting step, for example, the following three modes are given. First, when the connected cylinder 10 is the first connected cylinder 10A, (IIa) the sliding surface formation step of forming the sliding surface by finishing each of the inner peripheral surfaces 40B of the cylinder liners 40 is carried out only after the fitting step, or (IIb) after a coating formation step of forming a coating on each of the inner peripheral surfaces 40B of the cylinder liners 40 is carried out, the sliding surface formation step of forming the sliding surface by finishing a surface of the coating can be carried out, and the sliding surface formation step can be carried out only after the fitting step. When the connected cylinder 10 is the second connected cylinder 10B, (IIc) the sliding surface formation step of forming the sliding surface by finishing the surface 52B of each of the coatings 52 that cover the inner peripheral surfaces 50B of the connected cylinder main body portion 50 in which the cylinder bores 20 are formed can be carried out only after the fitting step.

In this case, when the sliding surface is formed by performing the finishing on the inner peripheral surface of each of the cylinder bores 20 for a plurality of times, the roughly finished surface formation step may be carried out before the fitting step, or may be carried out after the fitting step, or may be partially carried out before the fitting step so as to carryout the remaining part after the fitting step.

In the general related-art internal combustion engine in which the cylinder block is formed by cast-in of the cylinder liners with a casting material, the sliding surface formation step is carried out after the cylinder block is formed by cast-in of the cylinder liners with a casting material. Therefore, when the sliding surface is inspected after the sliding surface formation step is carried out, and the sliding surface is determined as defective as a result of inspection, the whole cylinder block in which the cylinder liners are cast is required to be disposed of.

Meanwhile, (I) in the case in which the sliding surface formation step is carried out before the fitting step, the sliding surface formation step is carried out for the connected cylinder 10 alone. Therefore, when the sliding surface is inspected after the sliding surface formation step is carried out, and the sliding surface is determined as defective as a result of inspection, the connected cylinder 10 alone is required to be disposed of. Therefore, even when a defective failure occurs, disposal loss in the manufacturing process can be reduced.

(I) In the case in which the sliding surface formation step is carried out before the fitting step, the sliding surface formation step may be directly carried out for the connected cylinder 10 alone. However, the sliding surface formation step may be carried out under a state in which the connected cylinder 10 is assembled to a jig that imitates the cylinder block main body 60 and the cylinder head. When the cylinder head is further assembled to the internal combustion engine 100 under a state in which the connected cylinder 10 is fitted to the cylinder block main body 60, the cylinder bores 20 are liable to be deformed at the time of assembly of the cylinder head. Therefore, when the sliding surface formation step is carried out using the jig in consideration of the deformation described above, it becomes easy to increase processing accuracy of the sliding surface.

Whether the sliding surface formation step is carried out before or after the fitting step can be appropriately selected in accordance with the whole manufacturing process of the internal combustion engine 100, specifications of the internal combustion engine 100, and other conditions. For example, when the connected cylinder 10 or the cylinder block main body 60, which has high dimensional accuracy and high strength and is less liable to be deformed, is used for the manufacture of the internal combustion engine 100 or a pressing force that may cause deformation of the cylinder bores 20 is less liable to be applied at the time of assembly of the cylinder head, (I) the sliding surface formation step is carried out before the fitting step. In an opposite case, (II) the sliding surface formation step may be carried out after the fitting step.

When cooling capability for portions of the internal combustion engine 100 to be manufactured, which are located at the periphery of the cylinder bores 20, is desired to be improved, it is preferred to carry out a cooling fluid passage formation step of forming the cooling fluid passage between two adjacent ones of the cylinder bores 20 of the connected cylinder 10. In this case, although the cooling fluid passage formation step may be carried out after the fitting step, it is more preferred to carry out the cooling fluid passage formation step before the fitting step. In any of the cases, another step may be carried out between the cooling fluid passage formation step and the fitting step as needed. In the cooling fluid passage formation step, processing means (for example, a drill, a water jet, or a laser) for sequentially continuing digging in one direction to form a linear passage is used to form the cooling fluid passage.

Thus, in comparison to (i) a case in which the cooling fluid passage formation step is carried out after the fitting step or (ii) a case in which the cooling fluid passage formation step is carried out in the related-art method of manufacturing an internal combustion engine, with which the cylinder block is formed by cast-in of the cylinder liners with a casting material, a degree of freedom in processing and formation of the cooling fluid passage can be increased in the case in which the cooling fluid passage formation step is carried out before the fitting step. The reason is as follows. In the above-mentioned cases (i) and (ii), when the cooling fluid passage is formed, the digging can be started only on the cylinder head side in order to form the cooling fluid passage. Meanwhile, in the case in which the cooling fluid passage formation step is carried out before the fitting step, the digging can be started on any of the cylinder head side (a cylinder-head side end surface side of the connected cylinder 10) and a side (the outer peripheral surface 10S of the connected cylinder 10) other than the cylinder head side. Thus, when a cooling design for the periphery of the cylinder bores 20 is made, it becomes easy to achieve a more ideal design. For example, a cooling passage, which is generally impossible to form in the cases (i) and (ii) described above, specifically, a cooling passage extending in parallel to the cylinder head-side end surface of the connected cylinder 10, can be formed.

In a case in which a processing error of the cooling fluid passage occurs, a target to be disposed of may be only the connected cylinder 10 regardless of timing of carrying out the cooling fluid passage formation step, specifically, before or after the fitting step, in comparison to the case (ii) described above. Therefore, the disposal loss caused by the processing error can be reduced.

Although the cooling fluid passage is required to be formed between two adjacent ones of the cylinder bores 20, the cooling fluid passage is generally formed in a region (a region M1 illustrated in FIG. 3) between the outer peripheral surfaces 40A of two adjacent ones of the cylinder liners 40 in the first connected cylinder 10A, and is generally formed in a region (a region M2 illustrated in FIG. 5) between outer peripheral side surfaces 52A of the coatings 52 that form the inner peripheral surfaces 20B of two adjacent ones of the cylinder bores 20 in the second connected cylinder 10B.

<Internal Combustion Engine, Connected Cylinder, and Cylinder Block Main Body>

More suitable shapes and structures of the internal combustion engine 100 to be manufactured by the method of manufacturing an internal combustion engine according to this embodiment, and the connected cylinder 10 and the cylinder block main body 60 to be used therefor are now described below. The internal combustion engine 100 to be manufactured by the method of manufacturing an internal combustion engine according to this embodiment includes, as exemplified in FIG. 7 and FIG. 8, at least the connected cylinder 10 and the cylinder block main body 60, and has a structure in which the connected cylinder 10 is fitted to the hollow portion 64 of the cylinder block main body 60 so as to be removable.

In the internal combustion engine 100 according to this embodiment, the cooling fluid jacket provided so as to surround an outer peripheral side of the cylinder bores 20 can be provided (i) in the connected cylinder 10 (inside of the outer peripheral surface 10S of the connected cylinder 10), (ii) between the outer peripheral surface 10S of the connected cylinder 10 and the inner peripheral surface 64S of the hollow portion of the cylinder block main body 60, or (iii) in the cylinder block main body 60 (on an outer peripheral side of the inner peripheral surface 64S of the hollow portion 64). In the case (i) described above, however, the cooling fluid jacket is provided to the connected cylinder 10. Therefore, a structure of the connected cylinder 10 is complicated. In the case (ii) described above, the cooling fluid jacket is provided to the cylinder block main body 60. Therefore, a structure of the cylinder block main body 60 is complicated. Thus, it is preferred that the cooling fluid jacket be provided between the connected cylinder 10 and the cylinder block main body 60. Further, manufacturability is liable to be reduced due to complication of the structure. Therefore, it is preferred that no cooling fluid jacket be provided in the connected cylinder 10

Meanwhile, in the case (ii) described above, as compared to the related-art internal combustion engine in which the cylinder block including the cooling fluid jacket provided in the cylinder block is formed by cast-in of the cylinder liners with a casting material, a die having a complicated shape is not required to be used for the manufacture of the internal combustion engine 100. Therefore, the manufacturability of the internal combustion engine 100 is improved.

When the cooling fluid jacket is provided between the outer peripheral surface 10S of the connected cylinder 10 and the inner peripheral surface 64S of the hollow portion 64 of the cylinder block main body 60, as exemplified in FIG. 8, a cooling fluid jacket 70 is provided between another end side (cylinder head side) of the outer peripheral surface 10S of the connected cylinder 10 and another end side (cylinder head side) of the inner peripheral surface 64S of the hollow portion 64 of the cylinder block main body 60. Further, when being brought into contact with each other, one end side of the outer peripheral surface 10S of the connected cylinder 10 and one end side of the inner peripheral surface 64S of the hollow portion 64 of the cylinder block main body 60 serve as a portion in which the connected cylinder 10 is fitted to one end-side portion (fitting portion 64J) of the hollow portion 64 of the cylinder block main body 60 so as to be removable.

In any of the cases (i) to (iii) described above, a depth D (length in the Z direction) of the cooling fluid jacket 70 is not particularly limited and can be appropriately selected in accordance with design specifications of the internal combustion engine 100. When a total length L of the connected cylinder 10 in the direction of the center line C is used as a reference, for example, the depth D can be appropriately selected to fall within a range of from about ⅙ times to about ⅚ times of the total length L. For example, in the case of the internal combustion engine 100 having specifications for selectively and intensively cooling portions of the cylinder bores 20, which are located on the cylinder head side, the depth D can be set to fall within a range of from ⅙ times to ½ times, from ⅙ times to ⅓ times, or from ⅙ times to ¼ times of the total length L. In view of ease of formation of the shallow cooling fluid jacket 70 having the depth D being ½ times of the total length L or smaller, the case (ii) is the most suitable among the cases (i) to (iii) described above.

A sealing member, for example, an O-ring is arranged between the inner peripheral surface 64S of the fitting portion 64J and the outer peripheral surface 10S of the connected cylinder 10, which is opposed to the inner peripheral surface 64S of the fitting portion 64J, so as to prevent a cooling fluid (such as water) in the cooling fluid jacket 70 from leaking toward the crankcase 62. A groove that is continuous in a circumferential direction may be formed, as needed, at least in one surface selected from the inner peripheral surface 64S of the fitting portion 64J and the outer peripheral surface 10S of the connected cylinder 10, which is opposed to the inner peripheral surface 64S of the fitting portion 64J, and the sealing member may be mounted in the groove.

In order to improve strength and prevent deformation of the cylinder head side of the cylinder bores 20 and to improve reliability of the internal combustion engine 100 at the time of high supercharging, a projecting portion may be formed at least on a portion of the outer peripheral surface 10S of the connected cylinder 10, which is located on the another end side, and a distal end portion of the projecting portion may be brought into close contact with a portion of the inner peripheral surface 64S of the hollow portion 64 of the cylinder block main body 60, which is located on the another end side. From a similar point of view, the projecting portion may be formed at least on a portion of the inner peripheral surface 64S of the hollow portion 64 of the cylinder block main body 60, which is located on the another end side. Alternatively, as exemplified in FIG. 7 and FIG. 8, a fixing member 80 configured to fix the connected cylinder 10 and the cylinder block main body 60 to each other may be provided between the outer peripheral surface 10S of the connected cylinder 10, which is located on the another end side, and the inner peripheral surface 64S of the hollow portion 64 of the cylinder block main body 60, which is located on the another end side. In view of easier manufacture of the connected cylinder 10, it is more desired to use the fixing member 80 than to form the projecting portion on the outer peripheral surface 10S of the connected cylinder 10 or the inner peripheral surface 64S of the cylinder block main body 60.

When the fixing member 80 is used, a groove 12 may be formed in the outer peripheral surface 10S of the connected cylinder 10, which is located on the another end side, as exemplified in FIG. 1, FIG. 2, FIG. 4, and FIG. 8, and a groove 66 may also be formed in the inner peripheral surface 64S of the hollow portion 64 of the cylinder block main body 60, which is located on the another end side, at a position corresponding to the groove 12 formed in the outer peripheral surface 10S of the connected cylinder 10 as exemplified in FIG. 6 and FIG. 8 so as to prevent the fixing member 80 from being shifted from a predetermined position. In this case, one end of the fixing member 80 is fitted to the groove 12, and another end thereof is fitted to the groove 66. In this manner, the fixing member 80 can be arranged between the outer peripheral surface 10S of the connected cylinder 10 and the inner peripheral surface 64S of the hollow portion 64 of the cylinder block main body 60. The groove 12 may be formed in the connected cylinder 10 in advance, and the groove 66 may also be formed in the cylinder block main body 60 in advance. However, it is preferred to form the grooves 12 and 66 after the connected cylinder 10 in which the groove 12 has not been formed and the cylinder block main body 60 in which the groove 66 has not been formed are fitted together.

As the connected cylinder 10 to be used for the method of manufacturing an internal combustion engine according to this embodiment, a shape and a structure of the first connected cylinder 10A are not particularly limited as long as the first connected cylinder 10A includes the two or more cylinder liners 40 and the connecting portion 42 configured to connect the two or more cylinder liners 40 to each other, and a shape and a structure of the second connected cylinder 10B are not particularly limited as long as the second connected cylinder 10B includes the connected cylinder main body portion 50 having the two or more cylinder bores 20 and the coatings 52 configured to cover the inner peripheral surfaces 50B of the connected cylinder main body portion 50 in which the cylinder bores 20 are formed. Similarly, a shape and a structure of the cylinder block main body 60 are not particularly limited as long as the cylinder block main body 60 has one end side (Z2 side) where the crankcase 62 is formed and another end side (Z1 side) where the cylinder head is attachable, and the hollow portion 64 passing through the cylinder block main body 60 from the one end side to the another end side.

Meanwhile, it is preferred that the connected cylinder 10 and the cylinder block main body 60 achieve all of excellent maintainability, excellent recycling efficiency, and a high degree of freedom in design of the internal combustion engine 100 to be manufactured through use of the connected cylinder 10 and the cylinder block main body 60, and have easily manufacturable shape and structure. However, the connected cylinder 10 and the cylinder block main body 60 are combined for use in manufacture of the internal combustion engine 100. Therefore, even when the shape and the structure of the connected cylinder 10 are determined in consideration only of the manufacturability of the connected cylinder 10, the shape and the structure of the cylinder block main body 60 to be used in combination with the connected cylinder 10 are complicated to reduce the manufacturability of the cylinder block main body 60, and further, to reduce the manufacturability of the internal combustion engine 100 in some cases. The same applies to a case in which the shape and the structure of the cylinder block main body 60 are determined in consideration only of the manufacturability of the cylinder block main body 60. Therefore, in consideration of the above-mentioned points, the inventors of the present invention have found that shapes and structures described below are suitable as the shape and the structure of the connected cylinder 10 and the shape and the structure of the cylinder block main body 60 to be used in combination therewith.

Figure 9:
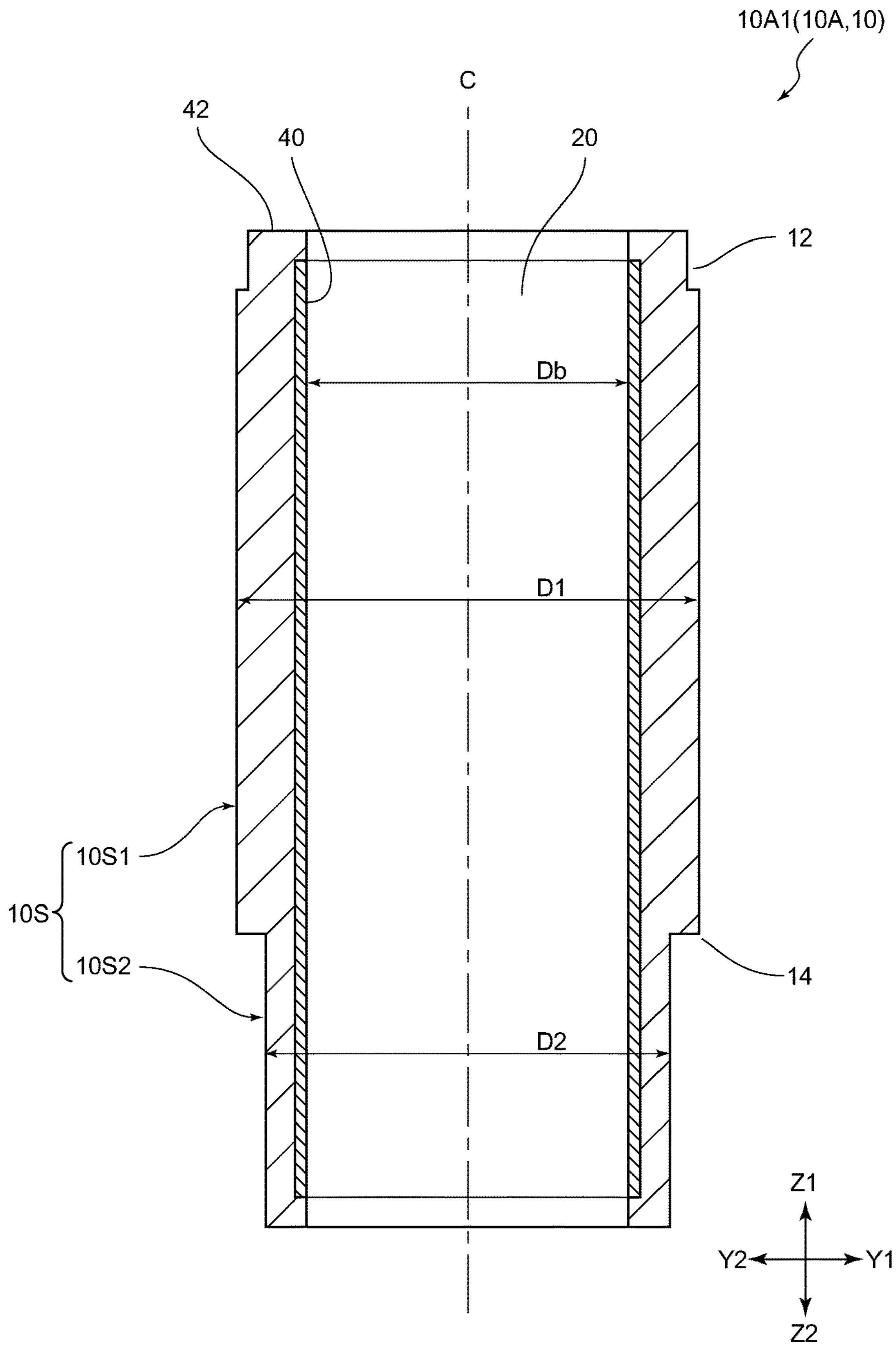
FIG. 9 is a schematic sectional view for illustrating an example of a sectional structure of the first connected cylinder illustrated in FIG. 3, which is taken along the line IX-IX.

First, the first connected cylinder 10A includes the two or more cylinder liners 40 and the connecting portion 42 configured to connect the two or more cylinder liners 40 to each other, and has the connected ring-like outer peripheral shape having the ring-like portions each with the diameter obtained by increasing the bore diameter Db of each of the cylinder liners 40, as exemplified in FIG. 9 for illustrating a sectional structure (YZ sectional structure) of the first connected cylinder 10A illustrated in FIG. 1 and FIG. 3, which is taken along the line IX-IX. Further, it is preferred that an outer diameter D1 of an outer peripheral surface (first region 10S1) from a vicinity of the cylinder head side to a vicinity of a central portion in the direction of the center line C of each of the cylinder liners 40, which is based on the center line C of each of the cylinder liners 40 as a reference, be larger than an outer diameter D2 of an outer peripheral surface (second region 10S2) in a vicinity of the crankcase side, which is based on the center line C of each of the cylinder liners 40 as a reference, and a level difference 14, which is parallel to an outer peripheral direction and is continuous, be formed between the first region 10S1 and the second region 10S2.

Figure 10:
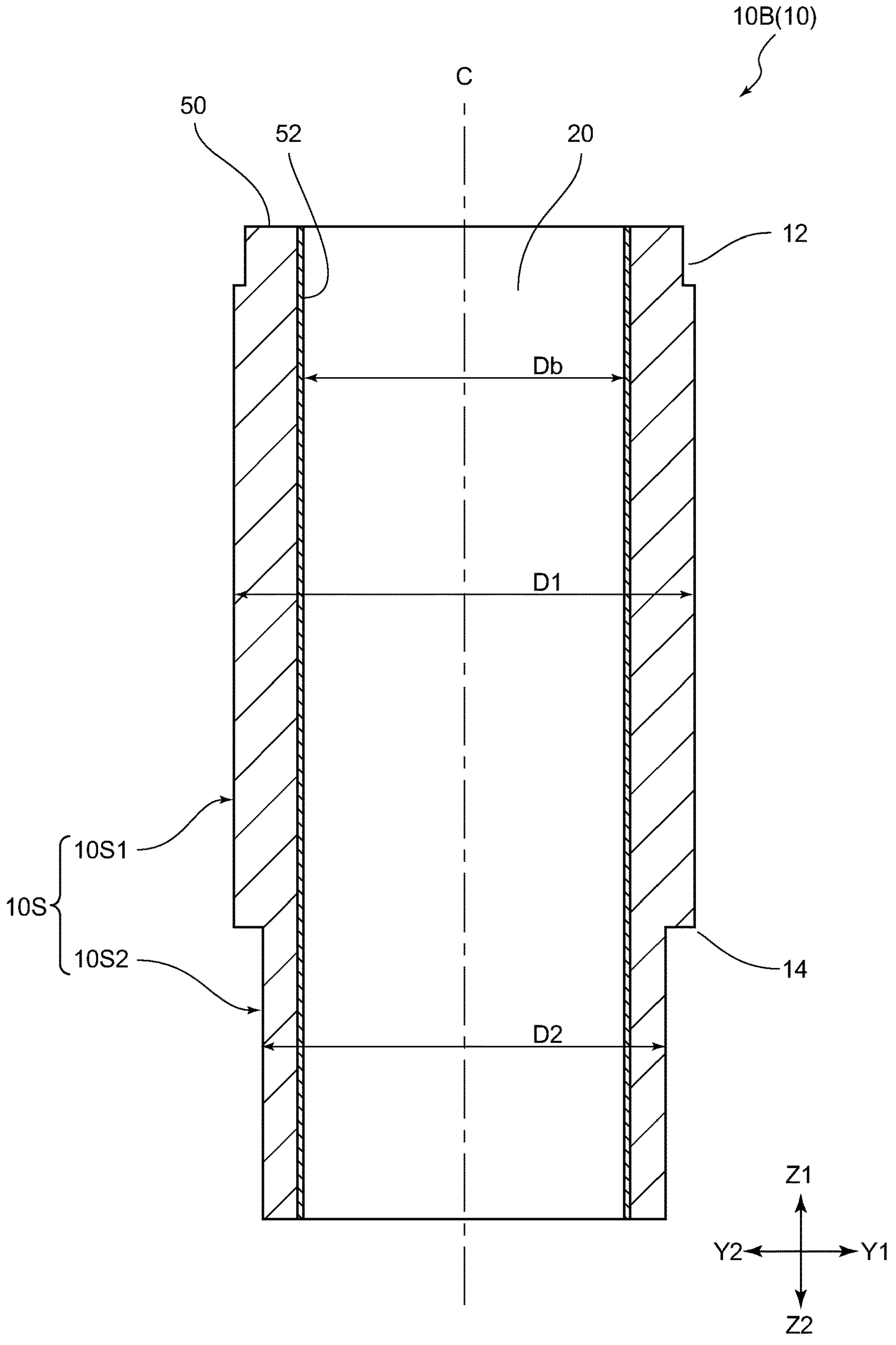
FIG. 10 is a schematic sectional view for illustrating an example of a sectional structure of the second connected cylinder illustrated in FIG. 5, which is taken along the line X-X.

The second connected cylinder 10B includes the connected cylinder main body portion 50 having the two or more cylinder bores 20 and the coatings 52 configured to cover the inner peripheral surfaces 50B of the connected cylinder main body portion 50 in which the cylinder bores 20 are formed, and has the connected ring-like outer peripheral shape having the ring-like portions each with the diameter obtained by increasing the bore diameter Db of each of the cylinder bores 20, as exemplified in FIG. 10 for illustrating a sectional structure (YZ sectional structure) of second connected cylinder 10B illustrated in FIG. 5, which is taken along the line X-X. Further, it is preferred that an outer diameter D1 of an outer peripheral surface (first region 10S1) from a vicinity of the cylinder head side to a vicinity of a central portion in the direction of the center line C of each of the cylinder bores 20, which is based on the center line C of each of the cylinder bores 20 as a reference, be larger than an outer diameter D2 of an outer peripheral surface (second region 10S2) in a vicinity of the crankcase side, which is based on the center line C of each of the cylinder bores 20 as a reference, and a level difference 14, which is parallel to an outer peripheral direction and is continuous, be formed between the first region 10S1 and the second region 10S2. The outer peripheral shape of the second connected cylinder 10B illustrated in FIG. 10 is similar to the outer peripheral shape of the first connected cylinder 10A illustrated in FIG. 1.

For the cylinder block main body 60, it is preferred that an opening shape of the hollow portion 64 be a connected ring shape corresponding to the outer peripheral shape of the connected cylinder 10 exemplified in FIG. 1, FIG. 9, and FIG. 10. More specifically, as exemplified in FIG. 6 and FIG. 8, it is preferred that a relationship of W1>W2>W3 is satisfied in the case that; the inner peripheral surface 64S of the hollow portion 64 has a first level difference 68A, which is continuous in the circumferential direction, and a second level difference 68B, which is continuous in the circumferential direction and is formed so as to be closer to the one end side (crankcase side) than the first level difference 68A; an opening width W1 of a portion of the hollow portion 64 having an inner peripheral surface 64S1, which is located on the another end side (cylinder head side) of the first level difference 68A; an opening width W2 of a portion of the hollow portion 64 having an inner peripheral surface 64S2, which is located on the one end side (crankcase side) of the second level difference 68A and on the another end side (cylinder head side) of the second level difference 68B; and an opening width W3 of a portion of the hollow portion 64 having an inner peripheral surface 64S3, which is located on the one end side (crankcase side) of the second level difference 68B. The opening widths W1, W2, and W3 are opening widths each in a suitable direction, regardless of whether the opening width is an opening width of an opening shape of the hollow portion 64 in a transverse direction (Y direction) or an opening width of the opening shape of the hollow portion 64 in a longitudinal direction (X direction). Specifically, it is preferred that the relationship of W1>W2>W3 be satisfied regardless of whether the opening width is that in the transverse direction (Y direction) or that in the longitudinal direction (X direction). Opening widths W1*sm*, W2*sm*, and W3*sm* illustrated in FIG. 8 represent maximum opening widths in the transverse direction (Y direction) of the opening shape of the hollow portion 64 and correspond to the opening widths W1, W2, and W3, respectively. The opening widths W2*sm* and W3*sm* are equal to the outer diameters D1 and D2 of the connected cylinder 10, respectively.

When the connected cylinder 10 having the level difference 14 formed on the outer peripheral surface 10S is fitted to the hollow portion 64 of the cylinder block main body 60 having the inner peripheral surface 64S on which the first level difference 68A and the second level difference 68B are formed, the fitting is achieved so that the second level difference 68B formed on the inner peripheral surface 64S of the cylinder block main body 60 and the level difference 14 formed on the outer peripheral surface 10S of the connected cylinder 10 match each other in the direction of the center line C. At the same time, on the side closer to the crankcase with respect to the first level difference 68A, the inner peripheral surface 6452 of the cylinder block main body 60 and the outer peripheral surface 10S (specifically, the first region 1051) of the connected cylinder 10 are directly held in close contact with each other or held in close contact with each other through the sealing member, and the inner peripheral surface 64S3 of the cylinder block main body 60 and the outer peripheral surface 10S (specifically, the second region 10S2) of the connected cylinder 10 are directly held in close contact with each other or held in close contact with each other through the sealing member. Specifically, on the outer peripheral surface 10S of the connected cylinder 10, a portion of the first region 10S1, which is located on a side closer to the second region 10S2, and the second region 10S2 forma fitting portion corresponding to the fitting portion 64J of the cylinder block main body 60. Therefore, on the cylinder head side with respect to the first level difference 68A, the cooling fluid in the cooling fluid jacket 70 that is formed between the inner peripheral surface 64S1 of the cylinder block main body 60 and the outer peripheral surface 10S (specifically, the first region 10S1) of the connected cylinder 10 can be prevented from leaking toward the crankcase 62.

Further, a capacity of the cooling fluid jacket 70 and a formation position of the cooling fluid jacket 70 in the direction of the center line C, which affect cooling characteristics inside the cylinder bores 20 and in the vicinity of the cylinder bores 20, can be easily adjusted by selecting, for example, when focusing on the cylinder block main body 60 side, (1) a value of the maximum opening width W1*sm* and (2) a formation position of the first level difference 68A in the direction of the center line C. The changes in size and shape of the cylinder block main body 60, which are described above in the items (1) and (2), are extremely easy even when the cylinder block main body 60 is manufactured by the casting or the resin molding. The reason is as follows. Even when the cylinder block main body 60 is manufactured by the casting or the resin molding, with which a defective failure due to the volume contraction is liable to occur, the cylinder block main body 60 has an extremely smaller volume capacity than that of the related-art cylinder block that is formed by cast-in of the cylinder liners, and thus the defective failure described above is less liable to occur.

The level difference 14 formed at a position corresponding to the second level difference 68B formed on the cylinder block main body 60 can be formed at an appropriate position on the outer peripheral surface 10S in the direction of the center line C. When an end surface of the connected cylinder 10 in the direction of the center line C, which is located on the side closer to the crankcase 62, is defined as a reference position (position 0) and the end surface thereof, which is located on the side closer to the cylinder head, is defined as a position L, it is preferred that the level difference 14 be formed to fall within a range larger than 0 and equal to or smaller than ½L, more preferably, within a range equal to or larger than ⅙L and equal to or smaller than 3/7L, further preferably, within a range equal to or larger than ⅙L and equal to or smaller than ⅓L. When the level difference 14 is formed at the position that is larger than ½L, the first level difference 68A that is formed on the cylinder block main body 60 is required to be formed at a position closer to the cylinder head. Therefore, in the direction of the center line C, a range in which the first level difference 68A is formed is further reduced. As a result, a margin for increasing or reducing the depth D of the cooling fluid jacket 70 by a design change in accordance with the requirement specifications of the internal combustion engine 100 is reduced.

It is preferred that the outer peripheral shape of the connected cylinder 10 basically be a simple shape having the level difference 14 that divides the outer peripheral surface 10S into the first region 10S1 and the second region 10S2. The groove 12 to which the fixing member 80 is to be fitted or the groove to which the sealing member is to be mounted may be formed as needed.

Meanwhile, the projecting portion that projects from the outer peripheral surface 10S can be formed on the outer peripheral surface 10S of the connected cylinder 10 when needed, or the projecting portion is not required to be formed on any of the first region 10S1 and the second region 10S2 of the outer peripheral surface 10S of the connected cylinder 10.

When the projecting portion is not formed on the outer peripheral surface 10S, the following advantages are given. Specifically, when the projecting portion such as a flange is formed on the outer peripheral surface 10S, the projecting portion is liable to be broken when the connected cylinder 10 is carelessly hit against another member while the connected cylinder 10 is being handled or stored. When the projecting portion is not formed on the outer peripheral surface 10S, however, the damage described above can be prevented.

In addition, in a case in which the connecting portion 42 of the first connected cylinder 10A or the connected cylinder main body portion 50 of the second connected cylinder 10B is manufactured by the casting, when the projecting portion is formed on the outer peripheral surface 10S, a shape of the die becomes slightly complicated. In addition, the manufacturability is reduced by some degree. Further, when the projecting portion is formed on the first region 10S1, it becomes more difficult to redesign the capacity of the cooling fluid jacket 70 and the formation position of the cooling fluid jacket 70 in the direction of the center line C by appropriately redetermining (1) the value of the maximum opening width W1*sm* and (2) the formation position of the first level difference 68A in the direction of the center line C of the cylinder block main body 60. When the projecting portion is not formed on the outer peripheral surface 10S, however, the above-mentioned problems can be prevented.

Meanwhile, although the above-mentioned advantages are lost, cooling control for the internal combustion engine 100 can be more precisely performed by forming the projecting portion on the first region 10S1 of the outer peripheral surface 10S. In this case, as in the case of a first connected cylinder 10A2 (10A, 10) exemplified in FIG. 11, it is preferred that the flange portion 16 that partitions the first region 10S1 into a region on the cylinder head side (Z1-direction side) and a region on the crankcase side (Z2-direction side) be formed on the first region 10S1. In the example illustrated in FIG. 11, the flange portion 16 is formed continuously along the outer peripheral direction and has a connected ring shape that is arranged at a position in the direction of the center line C of the cylinder liner 40 so that the position is the same at any position in the outer peripheral direction. The first connected cylinder 10A2 illustrated in FIG. 11 is a member having the same structure as that of the first connected cylinder 10A1 illustrated in FIG. 9 except that the flange portion 16 is formed on the first region 10S1. The flange portion 16 similar to that illustrated in FIG. 11 can also be formed on the first region 10S1 of the second connected cylinder 10B (10) illustrated in FIG. 10.

In the internal combustion engine 100 that uses the connected cylinder 10 having the flange portion 16 that partitions the first region 10S1 into the region on the cylinder head side (Z1-direction side) and the region on the crankcase side (Z2-direction side), the cooling fluid jacket 70 has a structure divided by the flange portion 16 in the direction of the center line C of the cylinder liner 40 or the cylinder bore 20. FIG. 12 and FIG. 13 are schematic sectional views each for illustrating an example of the internal combustion engine 100 including the connected cylinder 10 having the flange portion 16 formed on the first region 10S1. An internal combustion engine 100B (100) illustrated in FIG. 12 has the same structure as that of the internal combustion engine 100A illustrated in FIG. 8 except that the first connected cylinder 10A1 illustrated in FIG. 8 is replaced by the first connected cylinder 10A2 having the flange portion 16 illustrated in FIG. 11. An internal combustion engine 100C (100) illustrated in FIG. 13 has the same structure as that of the internal combustion engine 100A illustrated in FIG. 8 except that (i) the first connected cylinder 10A1 illustrated in FIG. 8 is replaced by the first connected cylinder 10A2 having the flange portion 16 illustrated in FIG. 11, and (ii) the cylinder block main body 60A illustrated in FIG. 8 is replaced by a cylinder block main body 60B having a structure in which a third level difference 68C being continuous in the circumferential direction is formed on the inner peripheral surface 64S1 of the cylinder block main body 60A.

The third level difference 68C is formed at a position corresponding to a side surface of the flange portion 16, which is located on the crankcase side (Z2-direction side). Based on the third level difference 68C as a boundary line, the internal peripheral surface 64S1 is partitioned into two regions, that is, a cylinder head-side region 64S1A, which is located on the cylinder head side (Z1-direction side) with respect to the third level difference 68C, and a crankcase-side region 64S1B, which is located on the crankcase side (Z2-direction side) with respect to the third level difference 68C. The crankcase-side region 64S1B is positioned on an inner peripheral side relative to the cylinder head-side region 64S1A. In the Y direction, the cylinder head-side region 64S1A illustrated in FIG. 13 is formed at a position so as to be flush with the inner peripheral surface 64S1 of the cylinder block main body 60A illustrated in FIG. 12. However, the cylinder head-side region 64S1A illustrated in FIG. 13 is not required to be formed at the position so as to be flush with the inner peripheral surface 64S1 of the cylinder block main body 60A illustrated in FIG. 12 as long as the cylinder head-side region 64S1A is positioned on an outer peripheral side relative to the crankcase-side region 64S1B.

In the internal combustion engine 100B illustrated in FIG. 12 and the internal combustion engine 100C illustrated in FIG. 13, the cooling fluid jacket 70, which is formed between the outer peripheral surface 10S (specifically, the first region 10S1) of the first connected cylinder 10A and the inner peripheral surface 64S1 of the hollow portion 64 of the cylinder block main body 60A, 60B, is divided by the flange portion 16 into a cylinder head-side portion (a cylinder head-side cooling fluid jacket 70A) and a crankcase-side portion (a crankcase-side cooling fluid jacket 70B). Therefore, the internal combustion engine 100B illustrated in FIG. 12 and the internal combustion engine 100C illustrated in FIG. 13 can control a flow velocity, a flow rate, and a water temperature of the cooling fluid flowing in the cooling fluid jacket 70 individually for the cylinder head-side cooling fluid jacket 70A and the crankcase-side cooling fluid jacket 70B in comparison to the internal combustion engine 100A illustrated in FIG. 8. Therefore, in the internal combustion engines 100B and 100C, it is extremely easy to perform temperature control individually for a portion closer to the cylinder head and a portion closer to the crankcase, which are included in a portion of the cylinder bores 20 surrounded by the cooling fluid jacket 70. When the characteristics described above are used, various advantages exemplified in the following items (a) to (c) can be easily achieved.

(a) A cylindricity of each of the cylinder bores 20 during an operation of the internal combustion engine 100B, 100C is improved by controlling a temperature of the portion closer to the cylinder head and a temperature of the portion closer to the crankcase, which are included in the portion of the cylinder bores 20 surrounded by the cooling fluid jacket 70.

(b) A temperature of an inner wall surface (sliding surface) of the cylinder bore 20, which is closer to the cylinder head, is decreased by improving cooling efficiency of the portion closer to the cylinder head relative to that of the portion closer to the crankcase, which are included in the portion of the cylinder bores 20 surrounded by the cooling fluid jacket 70. In this manner, anti-knocking capability is improved to improve the fuel efficiency.

(c) A flow velocity, a flow rate, and a water temperature of the cooling fluid in the cylinder head-side cooling fluid jacket 70A and a flow velocity, a flow rate, and a water temperature of the cooling fluid in the crankcase-side cooling fluid jacket 70B are individually set so that optimal output, fuel efficiency, and other advantages are obtained in accordance with operating conditions of the internal combustion engine 100B, 100C.

In the internal combustion engine 100B illustrated in FIG. 12, a top surface of the flange portion 16 is held in contact with the inner peripheral surface 64S1 of the cylinder block main body 60A. In the internal combustion engine 100C illustrated in FIG. 13, the top surface of the flange portion 16 is held in contact with the cylinder head-side region 64S1A of the inner peripheral surface 64S1 of the cylinder block main body 60A, and a crankcase-side (Z2-direction side) side surface of the flange portion 16, which is located on the top surface side, is held in contact with a level-difference surface portion of the third level difference 68C. In this case, it is preferred that a sealing member such as an O-ring be provided at an interface between the top surface of the flange portion 16 and the inner peripheral surface 64S1 to completely seal the interface between the flange portion 16 and the inner peripheral surface 64S1. The O-ring may be mounted in, for example, a groove that is formed in the top surface of the flange portion 16 along the circumferential direction so as to be used. In the case of the internal combustion engine 100C illustrated in FIG. 13, the O-ring may be mounted in a groove that is formed in the level-difference surface portion of the third level difference 68C along the circumferential direction so as to be used.

The sealing member may be omitted or a slight gap may be formed between the top surface of the flange portion 16 and the inner peripheral surface 64S1 as long as controllability for controlling the flow velocity, the flow rate, and the water temperature of the cooling fluid individually for the cylinder head-side cooling fluid jacket 70A and the crankcase-side cooling fluid jacket 70B is not greatly impaired. A flow passage, which penetrates in the direction of the center line C to connect the cylinder head-side cooling fluid jacket 70A and the crankcase-side cooling fluid jacket 70B to each other, may be formed in a portion of the flange portion 16 in the circumferential direction as needed.

The flange portion 16 can be formed at a freely-selected position on the first region 10S1 in the direction of the center line C as long as the cooling fluid jacket 70 can be divided into the cylinder head-side cooling fluid jacket 70A and the crankcase-side cooling fluid jacket 70B. When a cylinder head-side end of the first region 10S1 in the direction of the center line C is defined as a reference position 0 and a total length of the first region 10S1 in the direction of the center line C is defined as L1, it is preferred that the flange portion 16 be formed to fall within a range of from about 0.2×L1 to about 0.5×L1. Similarly, when a cylinder head-side end of the connected cylinder 10 in the direction of the center line C is defined as a reference position 0 and a total length of the connected cylinder 10 in the direction of the center line C is defined as L, it is preferred that the flange portion 16 be formed to fall within a range of from about 0.1×L to about 0.3×L.

Figure 11:
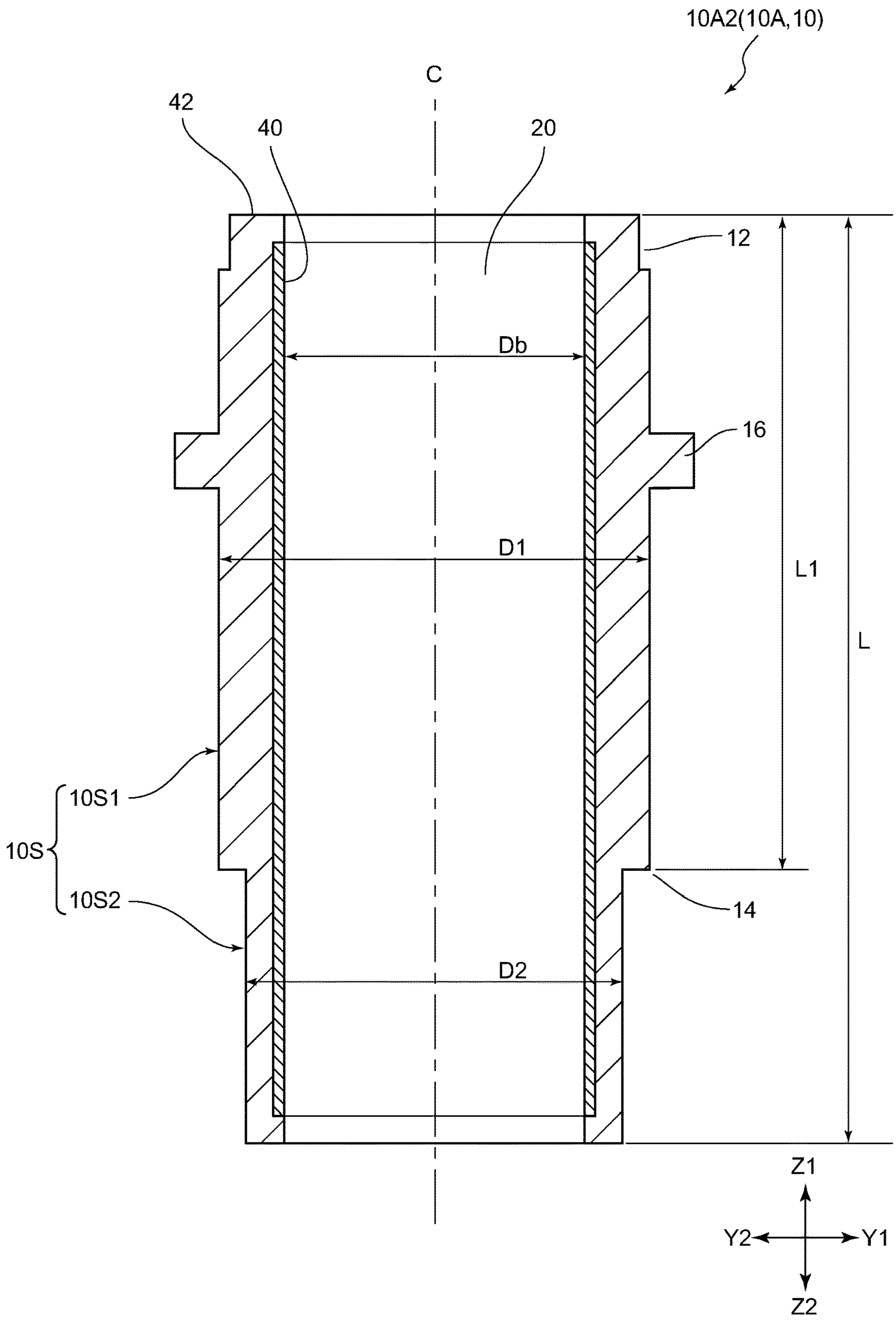
FIG. 11 is a schematic sectional view for illustrating a modification example of the first connected cylinder illustrated in FIG. 9.
Figure 12:
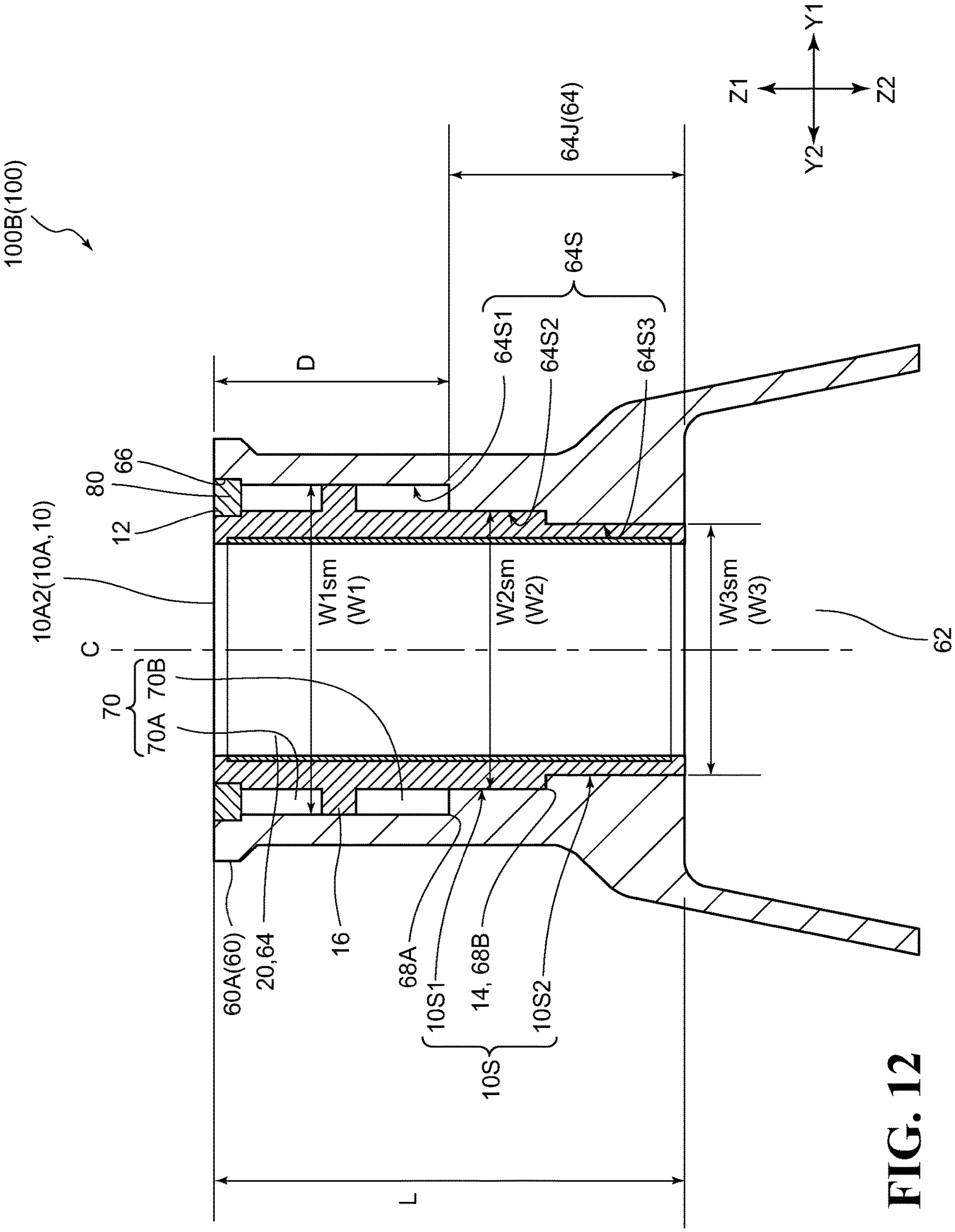
FIG. 12 is a schematic sectional view for illustrating a modification example of the internal combustion engine illustrated in FIG. 8.
Figure 13:
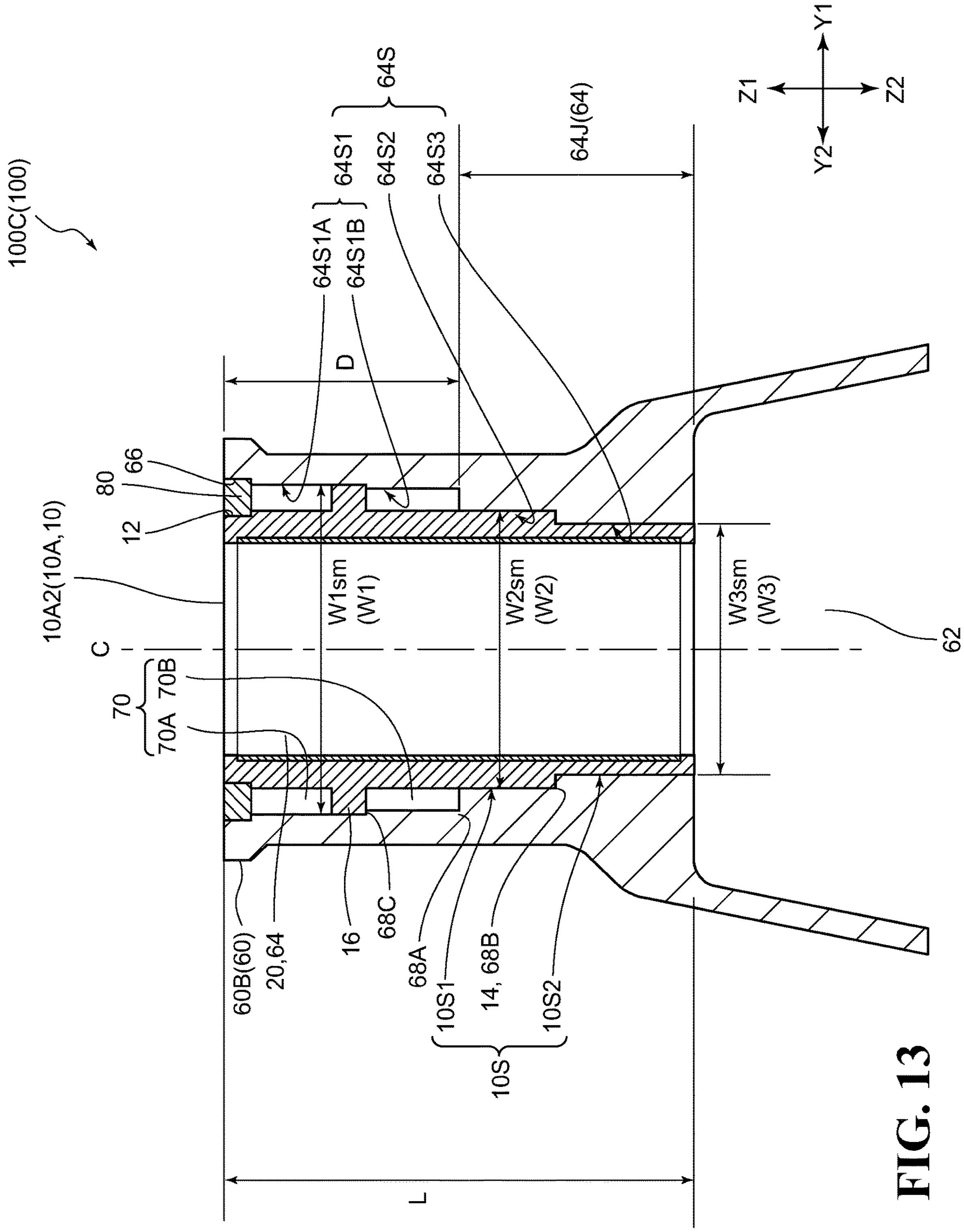
FIG. 13 is a schematic sectional view for illustrating another modification example of the internal combustion engine illustrated in FIG. 8.

Further, a shape and a formation position of the flange portion 16 formed on the first region 10S1 are not limited to those in the examples illustrated in FIG. 11 to FIG. 13 as long as the first region 10S1 can be partitioned into the cylinder head-side (Z1-direction side) region and the crankcase-side (Z2-direction side) region. The flange portion 16 is not necessarily required to be formed over the entire region in the outer peripheral direction so as to be parallel to the outer peripheral direction or may be formed so as to intersect with the outer peripheral direction or to be orthogonal to the outer peripheral direction (in other words, to be parallel to the center line C of the cylinder liner 40 or the cylinder bore 20) in a partial region in the outer peripheral direction.

For example, it is supposed that the first region 10S1 of the connected cylinder 10 is divided into two by a plane (XZ plane) containing the center lines C of the cylinder liners 40 or the cylinder bores 20 as a divisional boundary plane. In this case, the flange portion 16 having a connected semi-ring shape that is continuous so as to be parallel to the outer peripheral direction can be formed at a position relatively closer to the crankcase in one-side portion (Y1-direction side portion) of the first region 10S1 that has been divided into two, whereas the flange portion 16 having a connected semi-ring shape that is continuous so as to be parallel to the outer peripheral direction can be formed at a position relatively closer to the cylinder head in another-side portion (Y2-direction side portion) of the first region 10S1 that has been divided into two. Each end of the one flange portion 16 having the connected semi-ring shape and each end of the another flange portion 16 having the connected semi-ring shape are connected through the flange portion 16 formed so that the ends thereof are continuous in a direction parallel to the center line C. By adopting the configuration described above, a ratio of a depth of the cylinder head-side cooling fluid jacket 70A and a depth of the crankcase-side cooling fluid jacket 70B can be set so as to be different for the one side and the another side of the divisional boundary plane. The structure described above is effective in a case in which, for example, asymmetric cooling control is desired to be performed for the one side and the another side of the divisional boundary plane.

Further, the flange portion 16 may include, in addition to a first portion that partitions the first region 10S1 into the cylinder head-side (Z1-direction side) region and the crankcase-side (Z2-direction side) region, a second portion that partitions a portion of the first region 10S1, which forms a side wall surface of the cooling fluid jacket 70, in the outer peripheral direction. In the internal combustion engine 100 including the connected cylinder 10 having the flange portion 16 described above, the cooling fluid jacket 70 can be partitioned by the first portion in the direction of the center line C of the cylinder liner 40 or the cylinder bore 20. In addition, the cooling fluid jacket 70 can also be partitioned or divided by the second portion in the outer peripheral direction. Thus, it becomes easy to perform more precise cooling control not only in the direction of the center line C but also in the outer peripheral direction.

As a specific example, there can be exemplified the connected cylinder 10 having the flange portion 16 formed on the first region 10S1, the flange portion 16 having the first portion, which is formed continuously along the outer peripheral direction and forms such a connected ring shape that the position of arrangement thereof in the direction of the center line C is the same at any position in the outer peripheral direction, and two linear second portions, which are formed along a portion at which the divisional boundary plane and the first region 10S1 intersect with each other, and the internal combustion engine 100 using the same. In this case, the cooling fluid jacket 70 is divided by the first portion into the cylinder head-side cooling fluid jacket 70A and the crankcase-side cooling fluid jacket 70B. Further, by the second portions, the cylinder head-side cooling fluid jacket 70A is divided into the portion on the one side (Y1-direction side) of the divisional boundary plane and the portion on the another side (Y2-direction side), and the crankcase-side cooling fluid jacket 70B is divided into the portion on the one side (Y1-direction side) of the divisional boundary plane and the portion on the another side (Y2-direction side). Specifically, the cooling fluid jacket 70 is divided into four.

It is desired that the flange portion 16 formed on the connected cylinder 10 have at least the first portion. As needed, however, the internal combustion engine 100 may be constructed by using the connected cylinder 10 having the flange portion 16 formed only of the second portion.

In the internal combustion engine 100 according to this embodiment, the flange portion 16 may be formed not on the first region 10S1 of the connected cylinder 10 but on the inner peripheral surface 64S1 of the cylinder block main body 60 so as to divide the cooling fluid jacket 70 into the cylinder head-side cooling fluid jacket 70A and the crankcase-side cooling fluid jacket 70B. Although the flange portion 16 is formed integrally with a main body portion of the first connected cylinder 10A2 by casting in the first connected cylinder 10A2 exemplified in FIG. 11, the flange portion 16 may be formed by mounting and fixing (1) a member having a shape corresponding to the flange portion 16 having the connected ring shape or (2) a member having a shape corresponding to the flange portion 16 having the first portion having the connected semi-ring shape or the connected ring shape and the second portions each having the linear shape, which are described above, to the connected cylinder 10 without the flange portion 16 as exemplified in FIG. 9 and FIG. 10.

In the related-art internal combustion engine having a structure in which the plurality of cylinder liners are cast into the cylinder block, a portion other than the cylinder liners is formed integrally by casting. Therefore, in the related-art internal combustion engine, as in the cases of the internal combustion engine 100B illustrated in FIG. 12 and the internal combustion engine 100C illustrated in FIG. 13, it is impossible to achieve the structure (cooling fluid jacket divided structure) of the cooling fluid jacket 70 divided into the cylinder head-side cooling fluid jacket 70A and the crankcase-side cooling fluid jacket 70B only through the casting process. Further, in order to achieve the cooling fluid jacket divided structure after the casting, work for constructing the cooling fluid jacket divided structure is required to be performed in the cooling fluid jacket having a cylinder head-side opening portion with a small width and a large depth. Thus, the manufacturability is extremely low, and mass production is impossible. In the internal combustion engine 100 according to this embodiment, which uses the connected cylinder 10 having the flange portion 16, however, the cooling fluid jacket divided structure can be extremely easily achieved by combining the connected cylinder 10 having the flange portion 16 manufactured by the casting and the cylinder block main body 60 manufactured by the casting. Thus, mass productivity is extremely excellent.

REFERENCE SIGNS LIST

10: connected cylinder
10A, 10A1, 10A2: first connected cylinder
10B: second connected cylinder
10S: outer peripheral surface
10S1: first region (portion of outer peripheral surface 10S)
10S2: second region (portion of outer peripheral surface 10S)
12: groove
14: level difference
16: flange portion
20: cylinder bore
20B: inner peripheral surface
40: cylinder liner
40A: outer peripheral surface
40B: inner peripheral surface
42: connecting portion
50: connected cylinder main body portion
50B: inner peripheral surface
52: coating
52A: outer peripheral side surface
52B: surface
60, 60A, 60B: cylinder block main body
62: crankcase
64: hollow portion
64J: fitting portion
64S, 64S1, 64S2, 64S3: inner peripheral surface
64S1A: cylinder head-side region (portion of inner peripheral surface 64S1)
64S1B: crankcase-side region (portion of inner peripheral surface 64S1)
66: groove
68A: first level difference
68B: second level difference
68C: third level difference
70: cooling fluid jacket
70A: cylinder head-side cooling fluid jacket
70B: crankcase-side cooling fluid jacket
80: fixing member
100, 100A, 100B: internal combustion engine

The invention claimed is:

1. A method of manufacturing an internal combustion engine, comprising at least a fitting step of fitting a connected cylinder to a hollow portion of a cylinder block main body, the connected cylinder comprising two or more cylinder liners and a connecting portion configured to connect the two or more cylinder liners to each other the cylinder block main body having one end side where a crankcase is formed and another end side where a cylinder head is attachable, the hollow portion passing through the cylinder block main body from the one end side to the another end side, wherein the connected cylinder is manufactured by any one of methods selected from the group consisting of:

(a) a method of arranging the two or more cylinder liners in a die followed by pouring a molten metal into the die to cast the two or more cylinder liners with a casting material; and (b) a method of arranging the two or more cylinder liners in the die followed by performing resin molding for injecting or pouring a resin material in a molten state into the die, wherein <i> the two or more cylinder liners and the connecting portion are formed integrally and inseparably, wherein <ii> a space between two adjacent cylinder liners is filled with a material that forms the connecting portion without a gap, wherein <iii> entire outer peripheral surfaces of the two or more cylinder liners are covered with the connecting portion, and wherein <iv> an interface is defined between each of the two or more cylinder liners and the connecting portion.

2. The method of manufacturing an internal combustion engine according to claim 1, wherein a material that forms the two or more cylinder liners is different from a material that forms the connecting portion.

3. The method of manufacturing an internal combustion engine according to claim 1, further comprising a sliding surface formation step which is carried out under a state in which the connected cylinder is assembled to a jig that simulates the cylinder block main body and the cylinder head, wherein the sliding surface formation step comprises any one of steps selected from the group consisting of:

(a) forming sliding surfaces by finishing inner peripheral surfaces of the cylinder liners; and (b) forming coatings on inner peripheral surfaces of the cylinder liners followed by forming sliding surfaces by finishing surfaces of the coatings.

4. The method of manufacturing an internal combustion engine according to claim 1, wherein the two or more cylinder liners and the connecting portion are formed integrally and inseparably.

5. An internal combustion engine comprising at least:

a connected cylinder including two or more cylinder liners and a connecting portion configured to connect the two or more cylinder liners to each other and a cylinder block main body having one end side where a crankcase is formed, another end side where a cylinder head is attachable, and a hollow portion passing through the cylinder block main body from the one end side to the another end side, wherein the connected cylinder is fitted to the hollow portion of the cylinder block main body so as to be removable, wherein the connecting portion comprises a member made of any one of materials selected from the group consisting of:

(a) a casting material for casting the two or more cylinder liners by casting; and (b) a resin material for enclosing the two or more cylinder liners by resin molding, wherein <i> the two or more cylinder liners and the connecting portion are formed integrally and inseparably, wherein <ii> a space between two adjacent cylinder liners is filled with a material that forms the connecting portion without a gap, wherein <iii> entire outer peripheral surfaces of the two or more cylinder liners are covered with the connecting portion, and wherein <iv> an interface is defined between each of the two or more cylinder liners and the connecting portion.

6. The internal combustion engine according to claim 5, wherein a material that forms the two or more cylinder liners is different from a material that forms the connecting portion.

7. The internal combustion engine according to claim 5, wherein a cooling fluid jacket is provided between an outer peripheral surface of the connected cylinder and an inner peripheral surface of the hollow portion of the cylinder block main body, and wherein a fixing member configured to fix the connected cylinder and the cylinder block main body to each other is provided between a portion of the outer peripheral surface of the connected cylinder, which is located on the another end side, and a portion of the inner peripheral surface of the cylinder block main body, which is located on the another end side.

8. The internal combustion engine according to claim 5, wherein a cooling fluid jacket is provided between an outer peripheral surface of the connected cylinder and an inner peripheral surface of the hollow portion of the cylinder block main body, and wherein, when a total length L of the connected cylinder in a direction of a center line of the connected cylinder is used as a reference, a depth D of the cooling fluid jacket is set to fall within a range of from $\frac{1}{6}$ times to $\frac{1}{2}$ times of the total length L.

9. A connected cylinder, comprising:

two or more cylinder liners; and a connecting portion configured to connect the two or more cylinder liners to each other, wherein the connecting portion comprises a member made of any one of materials selected from the group consisting of:

(a) a casting material for casting the two or more cylinder liners by casting; and (b) a resin material for enclosing the two or more cylinder liners by resin molding, wherein <i> the two or more cylinder liners and the connecting portion are formed integrally and inseparably.

10. The connected cylinder according to claim 9, wherein a material that forms the two or more cylinder liners is different from a material that forms the connecting portion.

11. The connected cylinder according to claim 9, wherein a flange portion that partitions the first region into a region on the cylinder head side and a region on the crankcase side is formed on the first region.

12. The connected cylinder according to claim 9, wherein the connected cylinder has a connected ring-like outer peripheral shape having a ring-like portion with a diameter larger than a bore diameter of each of the cylinder liners, wherein an outer diameter (D1) of a first region formed of an outer peripheral surface from a vicinity of a cylinder head side to a vicinity of a central portion in a direction of a center line of each of the cylinder liners based on the center line of each of the cylinder liners as a reference is larger than an outer diameter (D2) of a second region formed of an outer peripheral surface in a vicinity of a crankcase side based on the center line of each of the cylinder liners as a reference, and wherein a level difference that is parallel to an outer peripheral direction and is continuous is formed between the first region and the second region.

* * * * *